(12) United States Patent
    Demsky

(10) Patent No.: US 10,221,883 B2
(45) Date of Patent: Mar. 5, 2019

(54) APPARATUS FOR SUPPORTING ARTICLES

(71) Applicant: ArtSkills, Inc., Bethlehem, PA (US)

(72) Inventor: Michele Demsky, Hampton, NJ (US)

(73) Assignee: ARTSKILLS, INC.

( * ) Notice: Subject to any disclaimer, the term of this patent is extended or adjusted under 35 U.S.C. 154(b) by 0 days.

(21) Appl. No.: 15/482,144

(22) Filed: Apr. 7, 2017

(65) Prior Publication Data
US 2018/0291947 A1    Oct. 11, 2018

(51) Int. Cl.
    F16B 47/00    (2006.01)
    F16B 45/00    (2006.01)
    F16M 13/02    (2006.01)
    C09J 7/00     (2018.01)
    C09J 7/40     (2018.01)

(52) U.S. Cl.
    CPC .............. *F16B 47/003* (2013.01); *C09J 7/00* (2013.01); *C09J 7/40* (2018.01); *F16B 45/00* (2013.01); *F16M 13/022* (2013.01); *C09J 2201/618* (2013.01)

(58) Field of Classification Search
    CPC ........ F16B 47/00; F16B 47/003; F16B 45/00; F16M 13/022; C09J 7/0225; C09J 2201/618; A47G 1/17
    USPC ....... 248/205.3, 205.1, 205.4, 304, 343, 308
    See application file for complete search history.

(56) References Cited

U.S. PATENT DOCUMENTS

| | | |
|---|---|---|
| 4,024,312 A | 5/1977 | Korpman |
| 5,409,189 A | 4/1995 | Luehmann |
| 5,507,464 A * | 4/1996 | Hamerski ............... A47G 1/175 248/205.3 |
| 5,516,581 A | 5/1996 | Kreckel et al. |
| 5,626,932 A | 5/1997 | Luehmann et al. |
| 5,672,402 A | 9/1997 | Kreckel et al. |
| D386,067 S | 11/1997 | Hamerski et al. |
| D389,037 S | 1/1998 | Bries et al. |
| D389,399 S | 1/1998 | Bries et al. |
| D393,412 S | 4/1998 | Bries et al. |
| D393,414 S | 4/1998 | Bries et al. |
| D395,594 S | 6/1998 | Bries et al. |
| 5,888,335 A | 3/1999 | Kobe et al. |
| 5,897,949 A | 4/1999 | Luehmann et al. |
| 5,908,695 A | 6/1999 | Kobe et al. |
| 5,913,480 A | 6/1999 | Luehmann et al. |
| 5,921,514 A | 7/1999 | Schumann |
| 5,925,459 A | 7/1999 | Zimmermann et al. |
| 5,967,474 A * | 10/1999 | doCanto ................. A47G 1/175 248/205.3 |
| 5,989,708 A | 11/1999 | Kreckel |
| D417,385 S | 12/1999 | Bries et al. |

(Continued)

*Primary Examiner* — Nkeisha Smith
(74) *Attorney, Agent, or Firm* — Belles Katz LLC

(57) ABSTRACT

An apparatus for supporting articles. The apparatus may include a stretch-release adhesive tape, a support member having a hook member extending therefrom, and an access member coupled to the support member. The support member may be secured to the wall via the stretch-release adhesive tape. Furthermore, the access member may be pivotably coupled to the support member so that in a closed state the access member covers the stretch-release adhesive tape from view and in an open state the stretch-release adhesive tape is visible and can be gripped by a user to remove the stretch-release adhesive tape and the support member from the wall.

20 Claims, 18 Drawing Sheets

(56) References Cited

U.S. PATENT DOCUMENTS

| | | |
|---|---|---|
| D417,606 S | 12/1999 | Bries et al. |
| 6,001,471 A | 12/1999 | Bries et al. |
| 6,004,642 A | 12/1999 | Langford |
| 6,004,665 A | 12/1999 | Luehmann et al. |
| 6,004,670 A | 12/1999 | Kobe et al. |
| 6,082,686 A * | 7/2000 | Schumann ............ A47G 1/175 205/308 |
| 6,106,937 A | 8/2000 | Hamerski |
| 6,120,867 A | 9/2000 | Hamerski et al. |
| 6,131,864 A | 10/2000 | Schumann |
| 6,162,534 A | 12/2000 | Hamerski |
| 6,187,404 B1 | 2/2001 | Schumann |
| 6,231,962 B1 | 5/2001 | Bries et al. |
| 6,280,840 B1 | 8/2001 | Luehmann et al. |
| 6,284,378 B1 | 9/2001 | Junghans et al. |
| 6,372,335 B1 | 4/2002 | Luehmann et al. |
| 6,395,389 B1 | 5/2002 | Luehmann et al. |
| 6,403,206 B1 | 6/2002 | Bries et al. |
| 6,406,781 B1 | 6/2002 | Hamerski |
| 6,410,135 B1 | 6/2002 | Hamerski et al. |
| 6,494,424 B1 * | 12/2002 | Dickie ............... A47G 1/175 248/205.3 |
| 6,499,707 B2 | 12/2002 | Hamerski et al. |
| 6,527,900 B1 | 3/2003 | Kreckel et al. |
| 6,541,089 B1 | 4/2003 | Hamerski et al. |
| 6,558,789 B1 | 5/2003 | Hamerski et al. |
| 6,569,521 B1 | 5/2003 | Sheridan et al. |
| 6,572,945 B2 | 6/2003 | Bries et al. |
| 6,616,790 B2 | 9/2003 | Luhmann et al. |
| D480,292 S | 10/2003 | Johansson et al. |
| 6,641,096 B2 | 11/2003 | Johansson et al. |
| 6,641,892 B2 | 11/2003 | Luhmann |
| 6,641,910 B1 | 11/2003 | Bries et al. |
| 6,676,093 B2 | 1/2004 | Franck et al. |
| 6,692,807 B2 | 2/2004 | Bries et al. |
| 6,723,407 B2 | 4/2004 | Dollase et al. |
| 6,756,089 B2 | 6/2004 | Yoneya et al. |
| 6,773,779 B2 | 8/2004 | Franck et al. |
| 6,811,126 B2 * | 11/2004 | Johansson ............ A47G 1/175 248/205.3 |
| 6,821,619 B2 | 11/2004 | Hamerski et al. |
| 6,835,452 B1 | 12/2004 | Hamerski |
| 6,841,241 B2 | 1/2005 | Luhmann et al. |
| 6,887,919 B2 | 5/2005 | Krawinkel et al. |
| 6,894,204 B2 | 5/2005 | Dunshee |
| 6,905,100 B2 | 6/2005 | Franck et al. |
| 6,910,667 B2 | 6/2005 | O'Leary et al. |
| 6,972,141 B1 | 12/2005 | Bries et al. |
| 6,984,428 B2 | 1/2006 | Krawinkel et al. |
| 6,994,904 B2 | 2/2006 | Joseph et al. |
| 7,028,958 B2 | 4/2006 | Pitzen et al. |
| 7,063,887 B2 | 6/2006 | Kobe et al. |
| 7,078,093 B2 | 7/2006 | Sheridan et al. |
| 7,078,582 B2 | 7/2006 | Stebbings et al. |
| 7,101,615 B2 | 9/2006 | Luhmann et al. |
| 7,121,515 B2 | 10/2006 | Franck et al. |
| 7,175,898 B2 | 2/2007 | Luhmann et al. |
| 7,178,770 B2 * | 2/2007 | Ryu ............... A47G 1/175 248/205.3 |
| 7,179,529 B2 | 2/2007 | Mizuno et al. |
| D543,837 S | 6/2007 | Newbould et al. |
| 7,264,870 B2 | 9/2007 | Luhmann et al. |
| 7,276,272 B2 | 10/2007 | Mizuno et al. |
| D554,481 S | 11/2007 | Newbould et al. |
| D554,482 S | 11/2007 | Hager et al. |
| D554,483 S | 11/2007 | Hager et al. |
| 7,309,524 B2 | 12/2007 | Krawinkel |
| D565,939 S | 4/2008 | Newbould et al. |
| 7,407,709 B2 | 8/2008 | Zhou et al. |
| D583,653 S | 12/2008 | Thompson et al. |
| D600,536 S | 9/2009 | Hager et al. |
| D600,538 S | 9/2009 | Thompson et al. |
| D609,995 S | 2/2010 | Hager et al. |
| D610,897 S | 3/2010 | Hager et al. |
| D610,898 S | 3/2010 | Hager et al. |
| D612,229 S | 3/2010 | Thompson et al. |
| 7,745,509 B2 | 6/2010 | Burton et al. |
| 7,781,056 B2 | 8/2010 | Bries et al. |
| 7,807,268 B2 | 10/2010 | Zhou et al. |
| 7,824,753 B2 | 11/2010 | Bartusiak |
| 7,833,577 B2 | 11/2010 | Sheridan et al. |
| 7,857,130 B2 | 12/2010 | Bartusiak |
| D632,950 S | 2/2011 | McGreevy et al. |
| D632,951 S | 2/2011 | McGreevy et al. |
| 7,892,384 B2 | 2/2011 | Bartusiak |
| D641,228 S | 7/2011 | Qiblawi et al. |
| D641,329 S | 7/2011 | Zhang |
| D653,525 S | 2/2012 | Pottes et al. |
| 8,128,781 B2 | 3/2012 | Krawinkel et al. |
| D665,653 S | 8/2012 | Thompson et al. |
| 8,241,720 B2 | 8/2012 | Sudo et al. |
| D667,293 S | 9/2012 | Thompson et al. |
| D670,997 S | 11/2012 | Thompson et al. |
| 8,334,037 B2 | 12/2012 | Sheridan et al. |
| D678,041 S | 3/2013 | Pan et al. |
| D679,578 S | 4/2013 | Gilboe et al. |
| D680,804 S | 4/2013 | Gilboe |
| D680,852 S | 4/2013 | Gilboe |
| D682,014 S | 5/2013 | Gilboe et al. |
| D682,664 S | 5/2013 | Gilboe et al. |
| 8,557,378 B2 | 10/2013 | Yamanaka et al. |
| 8,592,035 B2 | 11/2013 | Sakurai et al. |
| D697,388 S | 1/2014 | Pan |
| D697,389 S | 1/2014 | Pan |
| 8,653,190 B2 | 2/2014 | Chatterjee et al. |
| 8,673,419 B2 | 3/2014 | Determan et al. |
| 8,708,305 B2 * | 4/2014 | McGreevy ............ A47G 1/175 248/205.3 |
| 8,721,832 B2 | 5/2014 | Krawinkel et al. |
| 8,741,409 B2 | 6/2014 | Seth et al. |
| 8,814,112 B2 * | 8/2014 | Thompson ............ A47G 1/175 248/205.3 |
| D714,621 S | 10/2014 | Pan |
| D714,622 S | 10/2014 | Pan |
| D714,623 S | 10/2014 | Pan |
| D715,133 S | 10/2014 | Pan |
| D715,624 S | 10/2014 | Thompson et al. |
| D715,625 S | 10/2014 | Pan |
| D715,626 S | 10/2014 | Pan |
| D715,627 S | 10/2014 | Pan et al. |
| D716,134 S | 10/2014 | Pan et al. |
| 8,889,240 B2 | 11/2014 | Wood |
| D725,393 S | 3/2015 | Pan |
| 8,973,878 B2 | 3/2015 | Thompson |
| 9,052,058 B1 * | 6/2015 | Severson ............ A44C 15/003 |
| 9,228,117 B2 | 1/2016 | Sherman et al. |
| 9,238,758 B2 | 1/2016 | Determan et al. |
| D753,472 S | 4/2016 | Pan |
| D755,610 S | 5/2016 | Thompson et al. |
| 9,346,979 B2 | 5/2016 | Sheridan et al. |
| 9,717,323 B2 * | 8/2017 | Tsai ................ A44B 15/00 |
| 2003/0047654 A1 * | 3/2003 | Johansson ............ A47G 1/175 248/205.3 |
| 2011/0101183 A1 * | 5/2011 | Ernst ................ A47G 25/0607 248/216.1 |
| 2012/0145847 A1 | 6/2012 | Wang |
| 2016/0290555 A1 * | 10/2016 | Lee .................. A47G 1/175 |

\* cited by examiner

APPARATUS FOR SUPPORTING ARTICLES

FIELD OF THE INVENTION

The present invention relates generally to an apparatus for supporting articles, and more specifically to an apparatus for supporting articles that is removably secured to a surface using an adhesive tape.

BACKGROUND OF THE INVENTION

The use of hooks and the like to support articles from a vertical surface such as a wall is known. Such hooks are often secured to the wall via hardware such as anchors and screws. However, it is common for a homeowner or renter to later want to remove such hooks from the wall either to change up the décor or for other reasons. In such instances, removal of the hook leaves a hole in the wall that must be repaired. Thus, a need exists for a hook-like member that can be secured to a wall and later removed from the wall without leaving any markings on the wall that require repair. Furthermore, a need exists for such a hook-like member that has a clean look and is easy to both secure to the wall and remove from the wall.

SUMMARY OF THE INVENTION

The present invention is directed to an apparatus for supporting articles. The apparatus may include a stretch-release adhesive tape, a support member having a hook member extending therefrom, and an access member coupled to the support member. The support member may be secured to the wall via the stretch-release adhesive tape. Furthermore, the access member may be pivotably coupled to the support member so that in a closed state the access member covers the adhesive tape from view and in an open state the adhesive tape is visible and can be gripped by a user to remove the adhesive tape and the support member from the wall.

In one aspect, the invention may be an apparatus for supporting articles comprising: a stretch-release adhesive tape member having an adhesive portion and a gripping portion; a support member comprising: a rear surface configured to be mounted to a surface with the stretch-release adhesive tape member; a front surface opposite the rear surface; an upper end and a lower end, the support member extending between the upper and lower ends along a longitudinal axis; a hook member extending outward from the front surface of the support member and upward toward the upper end of the support member; an access member pivotably coupled to the support member so as to be pivotable, relative to the support member, about a first pivot axis between: (1) a closed-state; and (2) an open-state; wherein the first pivot axis is fixed relative to the support member and oriented substantially perpendicular to the longitudinal axis.

In another aspect, the invention may be an apparatus for supporting articles comprising: a support member comprising: a rear surface; a front surface opposite the rear surface; an upper end and a lower end, the support member extending between the upper and lower ends along a longitudinal axis; an access member pivotably coupled to the support member so as to be pivotable, relative to the support member, about a first pivot axis between: (1) a closed-state; and (2) an open-state; and a hook member extending from the front surface of the support member, the hook member pivotably coupled to the support member so as to be pivotable, relative to the support member, about a second pivot axis between: (1) a receiving-state; and (2) a retracted-state.

In yet another aspect, the invention may be an apparatus for supporting articles, the apparatus comprising: a front surface; a rear surface; a first side surface extending between the front surface and the rear surface; a second side surface extending between the front surface and the rear surface; a support member comprising an upper end and a lower end, the support member extending between the upper and lower ends along a longitudinal axis; an access member pivotably coupled to the support member so as to be pivotable, relative to the support member, about a first pivot axis between: (1) a closed-state; and (2) an open-state; a hook member extending from the front surface; and a first depression formed into the first side surface and a second depression formed into the second side surface that collectively define a narrowed waist section, a first flared section located on the support member, and a second flared section located on the access member.

In a further aspect, the invention may be an apparatus for supporting articles, the apparatus comprising: a stretch-release adhesive tape member having an adhesive portion and a gripping portion; a support member comprising: a rear surface configured to be mounted to a surface with the stretch-release adhesive tape member; a front surface opposite the rear surface; an upper end and a lower end, the support member extending between the upper and lower ends along a longitudinal axis; a transversely widened portion that facilitates gripping of the support member during stretching of the stretch-release adhesive tape member to release the support member from the surface; and a hook member extending outward from the front surface of the support member and upward toward the upper end of the support member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the preferred embodiments will be described with reference to the following drawings where like elements are labeled similarly, and in which.

DETAILED DESCRIPTION OF THE DRAWINGS

Figure 1:
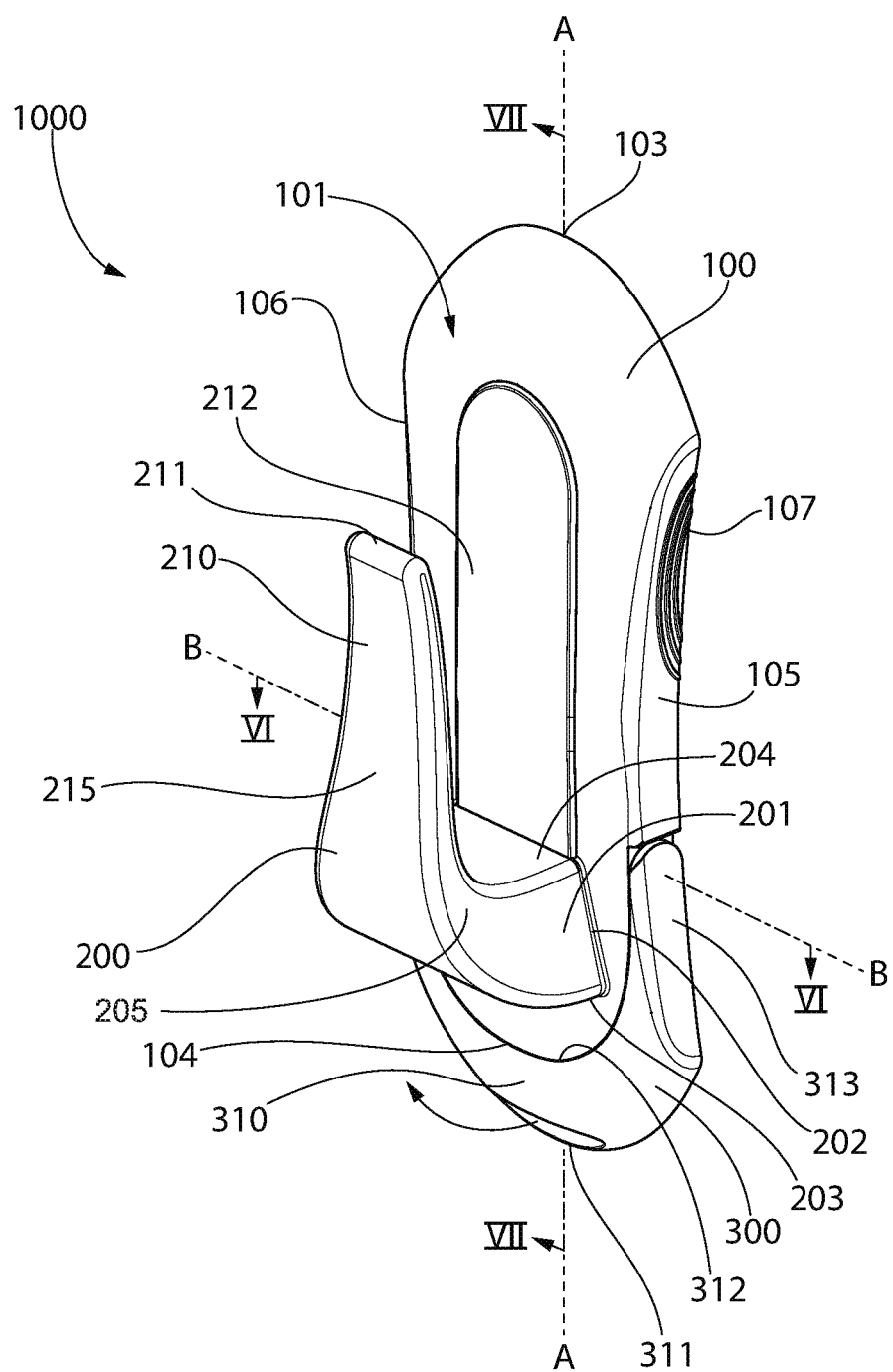
FIG. 1 is a front perspective view of an apparatus for supporting articles in accordance with an embodiment of the present invention illustrating an access member of the apparatus in a closed state.
Figure 2:
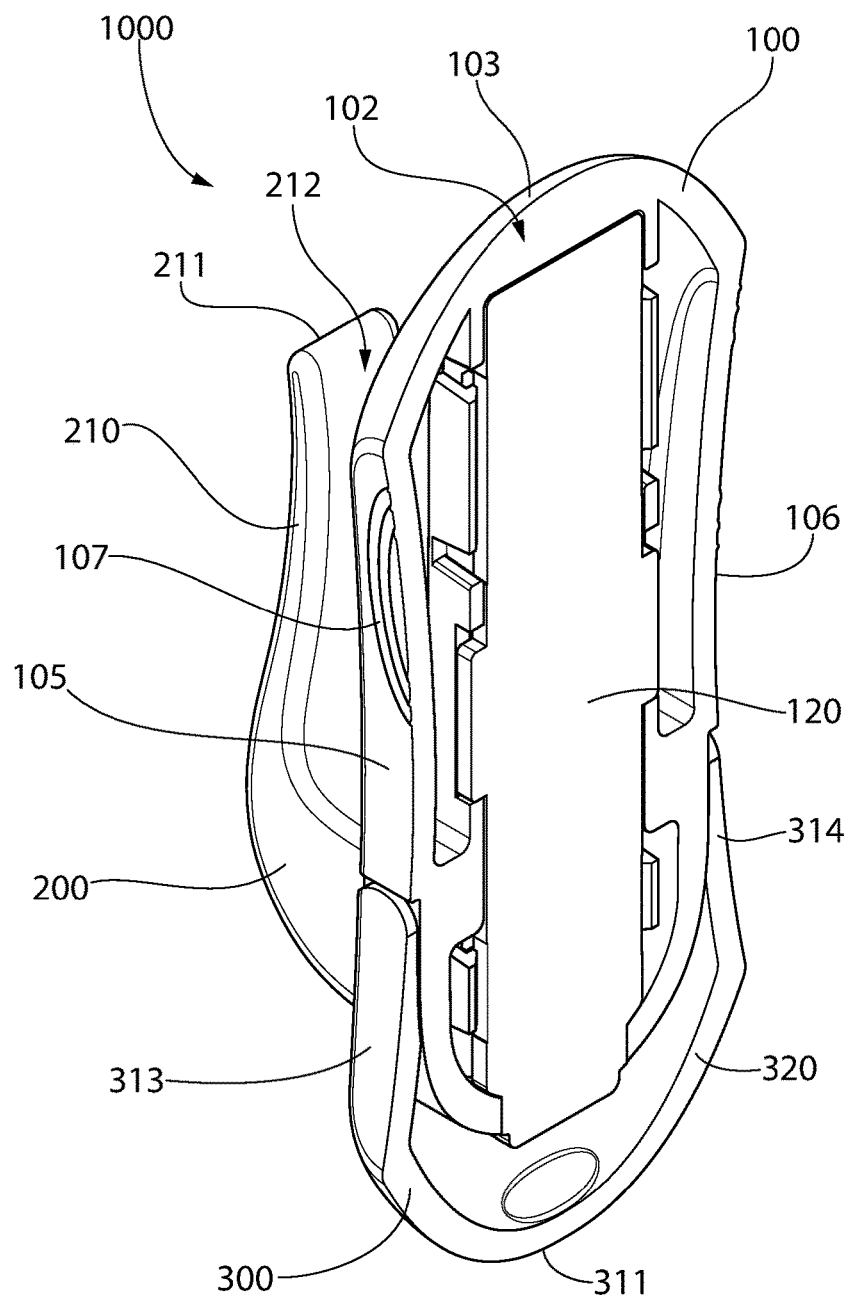
FIG. 2 is a rear perspective view of the apparatus of FIG. 1.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring to FIGS. 1-4 concurrently, an apparatus for supporting articles (hereinafter, "the apparatus") 1000 is illustrated in accordance with an embodiment of the present invention. The apparatus 1000 is configured to be secured to a surface, such as a wall, and to support an article. Examples of the types of articles that may be supported by the apparatus 1000 include clothing such as a coat or jacket, a backpack or other type of bag, artwork, hats, keys, or the like. Basically any article that is desired to be hung form a wall or other surface may be supported by the apparatus 1000. The invention is not to be particularly limited by the type of article being hung from the apparatus 1000.

The apparatus 1000 generally comprises a support member 100, a hook member 200, an access member 300, and a stretch-release adhesive tape member 400. The invention may be directed to the features of individual ones of the components and does not require all of these components in all embodiments. Thus, for example the invention may be directed to features of the support member 100 in some embodiments without also requiring features of the stretch-release adhesive tape member 400. In certain embodiments, the support member 100 and the hook member 200 may form an integral or monolithic (i.e., one-piece) structure, and in other embodiments the support member 100 and the hook member 200 may be separate structures that are coupled together. As discussed in greater detail below, the access member 300 is pivotably coupled to the support member 100. In the exemplified embodiment the access member 300 is a separate component from the support member 100, but they may also be integrally formed in some embodiments so long as the function described herein remains intact.

The stretch-release adhesive tape member 400 comprises a gripping portion 401 and an adhesive portion 402. Furthermore, the stretch-release adhesive tape member 400 has a front surface 403 and an opposite rear surface 404. The gripping portion 401 is free of adhesive on both the front and rear surfaces 403, 404 whereas the adhesive portion 402 is coated or covered (partially or completely) with an adhesive material 405 on both the front and rear surfaces 403, 404. A sufficient amount of the adhesive material 405 is coated onto the front and rear surfaces 403, 404 of the adhesive portion 402 of the stretch-release adhesive tape member 400 to ensure that it can remain mounted to a desired surface (such as a wall) and support a desired amount of weight (i.e., support an article) until removal by a user. Thus, the adhesive portion 402 of the stretch-release adhesive tape member 400 can be mounted to a surface with the rear surface 403 of the stretch-release adhesive member 400 in contact with the surface/wall and then the apparatus 100 may be mounted to the front surface of the stretch-release adhesive tape member 400. The stretch-release adhesive tape member 400 may be detached from the surface that it is adhered/mounted to by stretching the stretch-release adhesive member 400 along its longitudinal axis as described in greater detail below with reference to FIGS. 8C and 8D.

The apparatus 1000 may be formed of a hard plastic material in some embodiments. For example, the apparatus 1000, and particularly the support member 100, the hook member 200, and the access member 300 thereof, may be formed of plastic, which may be transparent in some embodiments and opaque in others. Furthermore, in some embodiments (such as the embodiment described herein below with reference to FIGS. 12-15) the hook member 200 may be formed of metal rather than plastic. The invention is not intended to be limited by the material of the various components of the apparatus 1000 unless specifically recited as such in the claims.

The support member 100 comprises a front surface 101, a rear surface 102 opposite the front surface 101, an upper end 103, and a lower end 104 opposite the upper end 103. The support member 100 extends between the upper and lower ends 103, 104 along a longitudinal axis A-A. The rear surface 102 is the surface of the support member 100 that is configured to be mounted to a surface (such as a wall or the like) via the stretch-release adhesive tape member 400.

Thus, during use as discussed in more detail herein below, the stretch-release adhesive tape member 400 is secured to a surface such as a wall, and then the rear surface 102 of the support member 100 is mounted to the stretch-release adhesive tape member 400 (or vice versa, meaning the stretch-release adhesive tape member 400 may first be secured to the rear surface 102 of the support member 100, and then the apparatus 1000 may be mounted to the desired surface/wall). The stretch-release adhesive tape member 400 is concealed by the access member 300 during normal use, but it can be accessed via pivoting of the access member 300 without moving the support member 100 so that the stretch-release adhesive tape member 400 and the support member 100 can be collectively removed from the surface as desired.

Figure 3:
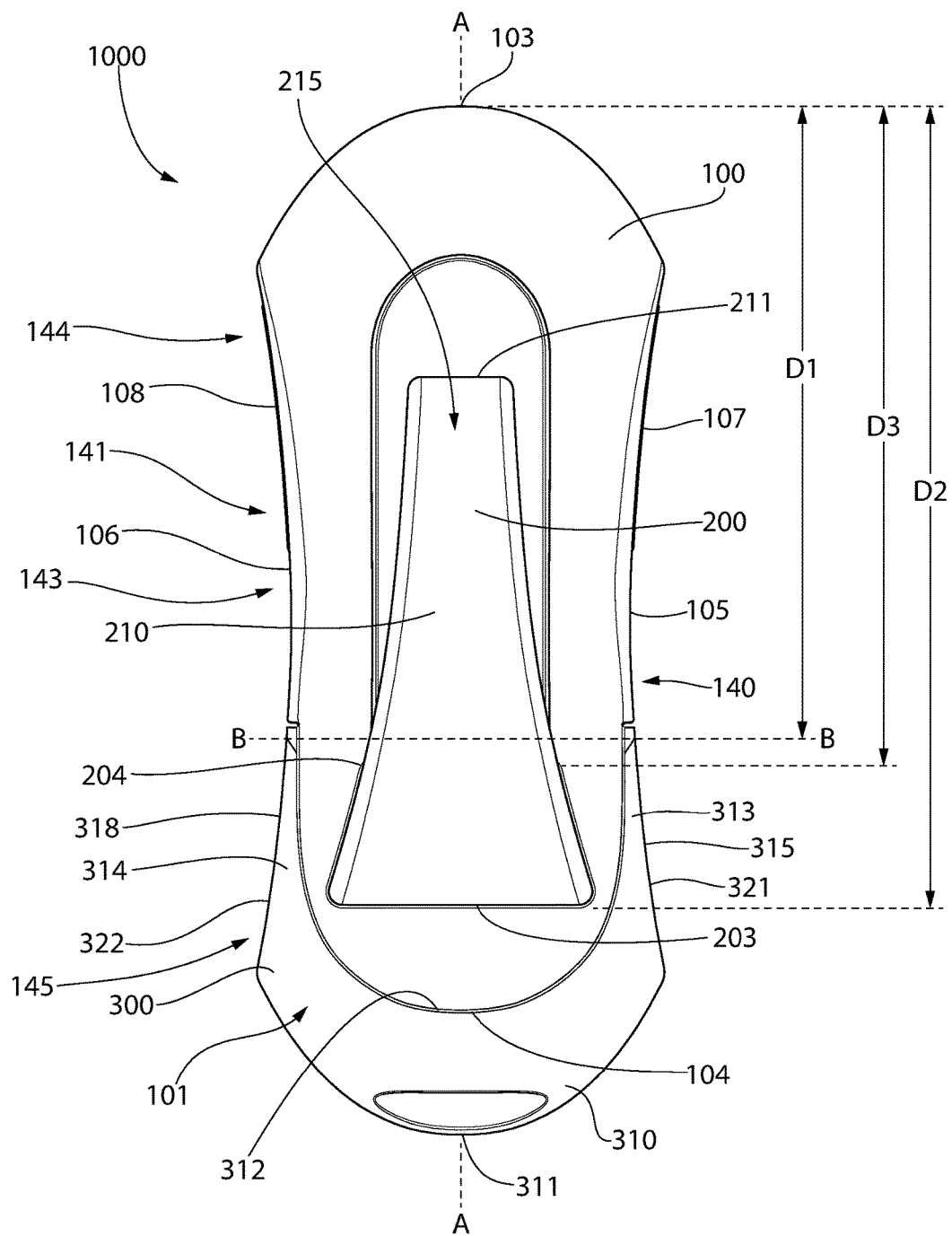
FIG. 3 is a front view of the apparatus of FIG. 1.

The support member 100 also comprises a first side surface 105 and a second side surface 106 opposite the first side surface 105. Each of the first and second side surfaces 105, 106 extend between the upper and lower ends 103, 104 and between the front and rear surfaces 101, 102 of the support member 100. As best seen in FIG. 3, each of the first and second side surfaces 105, 106 is concave in the axial direction. Thus, each of the first and second side surfaces 105, 106 is arcuate in shape or otherwise contoured so that the exposed surface thereof is concave. As discussed in greater detail below, this shape enhances a user's ability to maintain a grip on the support member 100 while separating it from the surface upon which it is mounted.

As illustrated in the figures, the support member 100 comprises a first gripping feature 107 located on the first side surface 105 and a second gripping feature 108 located on the second side surface 106. In the exemplified embodiment, the first gripping feature 107 is located on the first side surface 105 adjacent to the upper end 103 of the support member 100 and the second gripping feature 108 is located on the second side surface 106 adjacent to the upper end 103 of the support member 100. In the exemplified embodiment, each of the first and second gripping features 107, 108 comprises a plurality of protuberances. More specifically, each of the first and second gripping features 107, 108 comprises a plurality of arcuate ridges arranged concentrically in series. Each of the arcuate ridges is elongated in a direction of the longitudinal axis A-A and has a convex side facing towards the front surface 101 of the support member 100 and a concave side facing towards the rear surface 102 of the support member 100. The arcuate ridges are in a nesting arrangement and they are closely spaced apart from one another. Thus, the arcuate ridges provide surfaces to enhance a user's grip on the support member 100. Specifically, the concave shape of the first and second side surfaces 105, 106 in combination with the gripping features 107, 108 work in tandem to facilitate ready and easy gripping of the support member 100 by a user.

Although illustrated as arcuate ridge members in the exemplified embodiment, the first and second gripping features 107, 108 may take on other structural arrangements in other embodiments. Specifically, the first and second gripping features 107, 108 may comprise a plurality of spaced apart protuberances, elongated but non-arcuate ridges, ridges extending transversely along the first and second side surfaces 105, 106 between and perpendicular to the front and rear surfaces 101, 102, or the like. Thus, the invention is not to be limited by the particular structural configuration shown for the first and second gripping features 107, 108 in all embodiments.

The support member 100 further comprises a back plate 120 coupled to a main body of the support member 100. In the exemplified embodiment, the back plate 120 comprises flexible protrusions 121 that act as mechanical fasteners to secure the back plate 120 to the remainder of the support member 100. Specifically, as the back plate 120 is pressed against the support member 100, the flexible protrusions 121 contact projections 115 extending from the support member 100 (see FIG. 6). As the flexible protrusions 121 slide past the projections 115, the flexible protrusions 121 flex inwardly. Upon the flexible protrusions 121 passing the projections 115 entirely, the flexible protrusions 121 snap back outwardly to secure the back plate 120 in place. The back plate 120 forms a portion of the rear surface 102 of the support member 100, and specifically the portion of the rear surface 102 of the support member 100 that is coupled to the stretch-release adhesive tape member 400 during use. In certain embodiments, the back plate 120 may be altogether omitted or may be formed as an integral structure with the main body of the support member 100 rather than being a separate structure as illustrated in FIG. 4.

Figure 4:
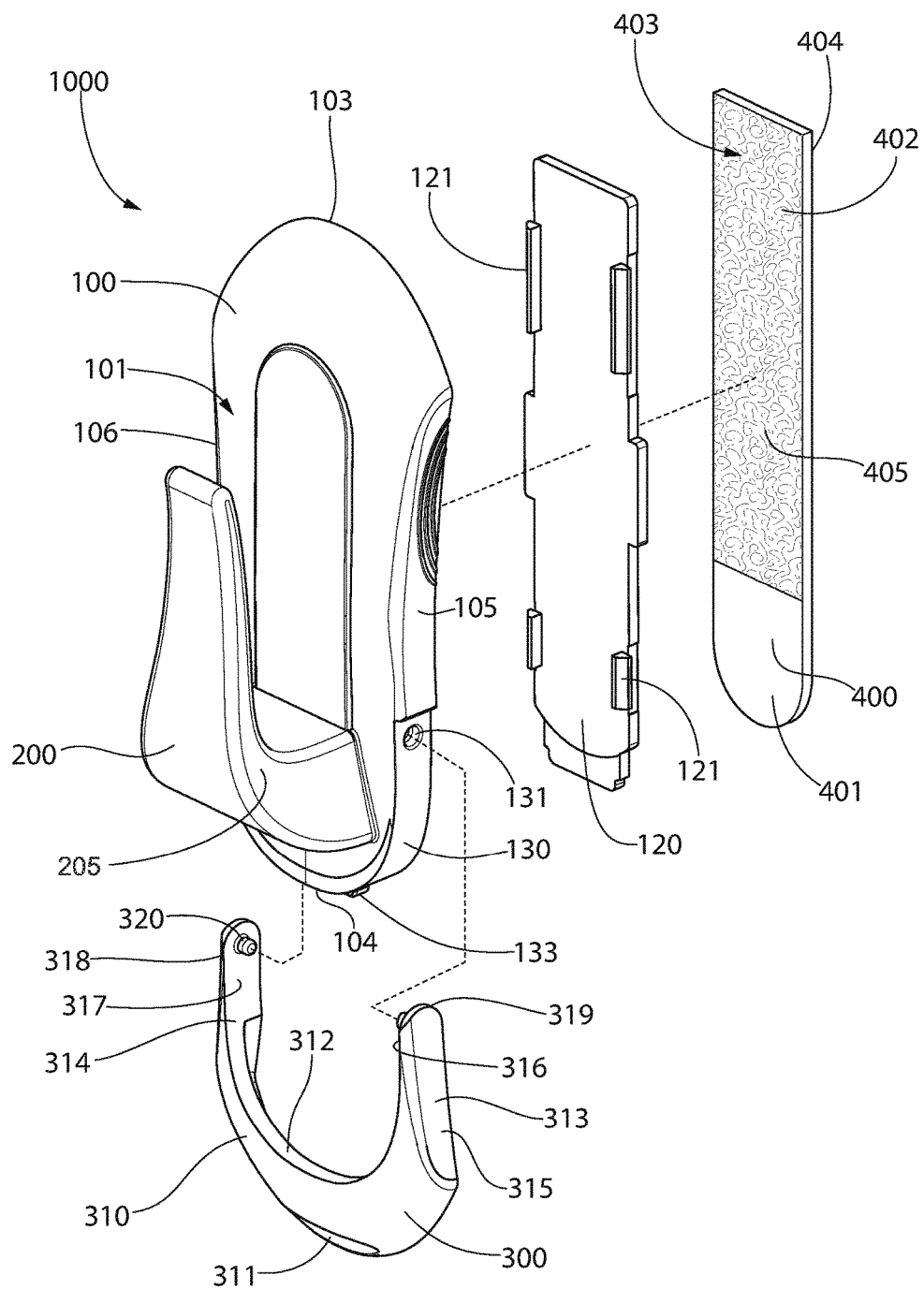
FIG. 4 is a front perspective exploded view of the apparatus of FIG. 1.
Figure 6:
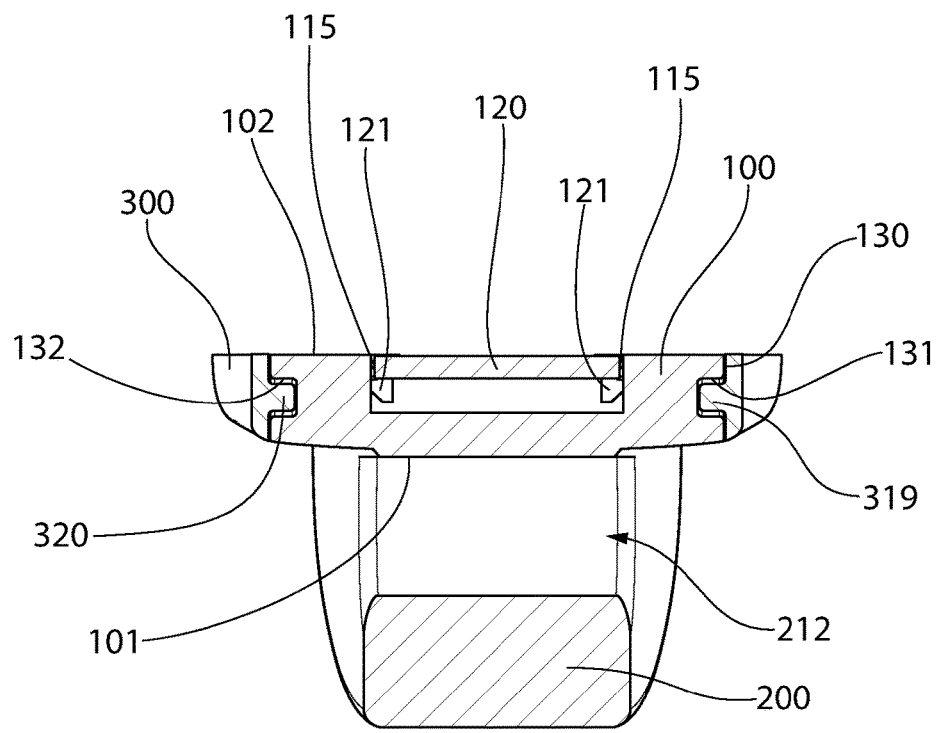
FIG. 6 is a cross-sectional view taken along line VI-VI of FIG. 1.

Referring briefly to FIGS. 4 and 6, the support member 100 comprises a lower sidewall 130 that extends between the first and second side surfaces 105, 106 and comprises the lower end 104 of the support member 100. The lower sidewall 130 is convex and U-shaped in the exemplified embodiment. In the fully assembled apparatus 100, the lower sidewall 130 is covered by the access member 300 and thus it is not exposed. The lower sidewall 130 comprises a first aperture 131 on a first side thereof adjacent the first side surface 105 and a second aperture 132 on a second side thereof adjacent the second side surface 106. As will be discussed in greater detail below, the first and second apertures 131, 132 receive a protuberance of the access member 300 to secure the access member 300 to the support member 100 while permitting the access member 300 to pivot relative to the support member 100. Furthermore, the support member 100 comprises a stopper tab 133 protruding from the lower sidewall 130 at the lower end 104 of the support member 100. The stopper tab 133 prevents over-rotation of the access member 300 relative to the support member 100 in one rotational direction.

Referring again to FIGS. 1-4, the hook member 200 extends outward from the front surface 101 of the support member 100 and upward towards the upper end 103 of the support member 100. Specifically, the hook member 200 comprises a base portion 201 having a proximal end 202 and a distal end 205. The proximal end 202 of the base portion 201 is coupled to the front surface 101 of the support member 100. The base portion 201 of the hook member 200 extends directly outward from the front surface 101 of the support member 100 in a direction generally perpendicular to the front surface 101 of the support member 100. The proximal end 202 of the base portion 201 of the hook member 200 comprises a lowermost surface 203 and an uppermost surface 204.

As noted previously, the hook member 200 may be integrally formed with the support member 100 or a portion thereof in some embodiments. However, whether the hook member 200 is integrally formed with the support member 100 or not, in certain embodiments the hook member 200 is fixed relative to the support member 100 such that the hook member 200 is non-movable relative to the support member 100 (with the exception of slight bending of the hook member 200 relative to the support member 100 which is likely to be permissible depending on the material from which the hook member 200 is made and its thickness). By fixed and non-movable, it is meant that the hook member 200 is not coupled to the support member 100 so as to be movable, but rather any movement of the hook member 200 relative to the support member 100 that might occur would be incidental and minimal.

The hook member 200 also comprises a retaining portion 210 extending upward from the distal end 205 of the base portion 201 towards the upper end 103 of the support member 100. Specifically, the retaining portion 210 extends from the base portion 201 upwardly to a distal end 211 of the retaining portion 210. In other embodiments, the hook member 200 may be more knob-shaped rather than being an L-shaped member as shown in the exemplified embodiment. In fact, the hook member 200, and specifically the retaining portion 210 thereof, can take on any shape or configuration so long as the hook member 200 remains configured to support an article such as those described above therefrom. Thus, the hook member 200 can take on any shape as long as the function of the retaining portion 210, which is to retain articles thereon, is achieved. In the exemplified embodiment, the retaining portion 210 is spaced apart from the front surface 101 of the support member 100 by a gap 212 along the entirety of its length. Thus, an article or a portion thereof (i.e., a hood of a coat, a loop on an article of clothing, a portion of a hat, etc.) may be inserted into the gap 212 and then slid downwardly to rest atop the uppermost surface 204 of the base portion 201 of the hook member 200 to be retained by the support member 100.

In the exemplified embodiment, the hook member 200 has a curved shape such that an outer facing surface 215 of the hook member 200 is contoured rather than flat. Specifically, the outer facing surface 215 of the hook member 200 is concave in the exemplified embodiment. The invention is not to be so limited in all embodiments and the shape of the hook member 200 may be modified so long as the hook member 200 remains configured to retain an article thereon as described herein.

The apparatus 1000 also comprises the access member 300, which is pivotably coupled to the support member 100. The access member 300 generally comprises a cover portion 310 comprising a lower edge 311 and an upper edge 312 and first and second arm members 313, 314 extending from the upper edge 312 in a spaced-apart manner. The lower edge 311 of the access member 300 is convex and the upper edge 312 of the access member 300 is concave. Thus, the access member 300 forms a generally U-shaped structure whereby the cover portion 310 forms the bight of the U and the first and second arm members 313, 314 form the arms of the U. The access member 300, and more specifically the cover portion 310 thereof, is configured to cover a gripping portion 401 of the stretch-release adhesive tape member 400 when the apparatus 1000 is properly mounted to a surface such as a wall via the stretch-release adhesive tape member 400. This will be discussed in greater detail below with reference to FIGS. 7-8D.

The first arm member 313 comprises an inner surface 315 and an outer surface 316. Similarly, the second arm member 314 comprises an inner surface 317 and an outer surface 318. A protuberance 319 extends from the inner surface 315 of the first arm member 313 in a direction towards the second arm member 314. Similarly, a protuberance 320 extends from the inner surface 317 of the second arm member 314 in a direction towards the first arm member 313.

The access member 300 is pivotably coupled to the support member 100 by inserting the protuberances 319, 320 of the access member 300 into the first and second apertures 131, 132 of the support member 100. Specifically, the access member 300 can be slid upwardly along the lower sidewall 130 of the support member 100. As the access member 300 is slid in this manner, the first and second arm members 313, 314 will flex slightly outwardly as the protuberances 319, 320 slide in direct contact with the lower sidewall 130. The access member 300 can be slid relative to the support member 100 until the protuberances 319, 320 enter into the first and second apertures 131, 132. At this point, the access member 300 is pivotably coupled to the support member 100. Thus, when the access member 300 is coupled to the support member 100, the first and second arm members 313, 314 are pivotably coupled to the support member 100 at an axial location.

Due to the manner in which the access member 300 is coupled to the support member 100, the access member 300 is freely pivotable relative to the support member 100. Specifically, the only thing connecting the access member 300 to the support member 100 is the protuberances 319, 320 and the apertures 131, 132. The apertures 131, 132 have a diameter that is slightly larger than the diameter of the protuberances 319, 320 to enable the access member 300 to pivot relative to the support member 100 while also ensuring that the access member 300 remains coupled to the support member 100. Thus, the access member 300 can be pivoted relative to the support member 100 about a first pivot axis B-B. The first pivot axis B-B intersects the first and second apertures 131, 132 and the protuberances 319, 320. Furthermore, the first pivot axis B-B is fixed relative to the support member 100 and is oriented substantially perpendicular to the longitudinal axis A-A of the support member 100. Specifically, the first pivot axis B-B is at a fixed position relative to the support member 100 and the location of the first pivot axis B-B relative to the support member 100 cannot be changed.

Figure 5:
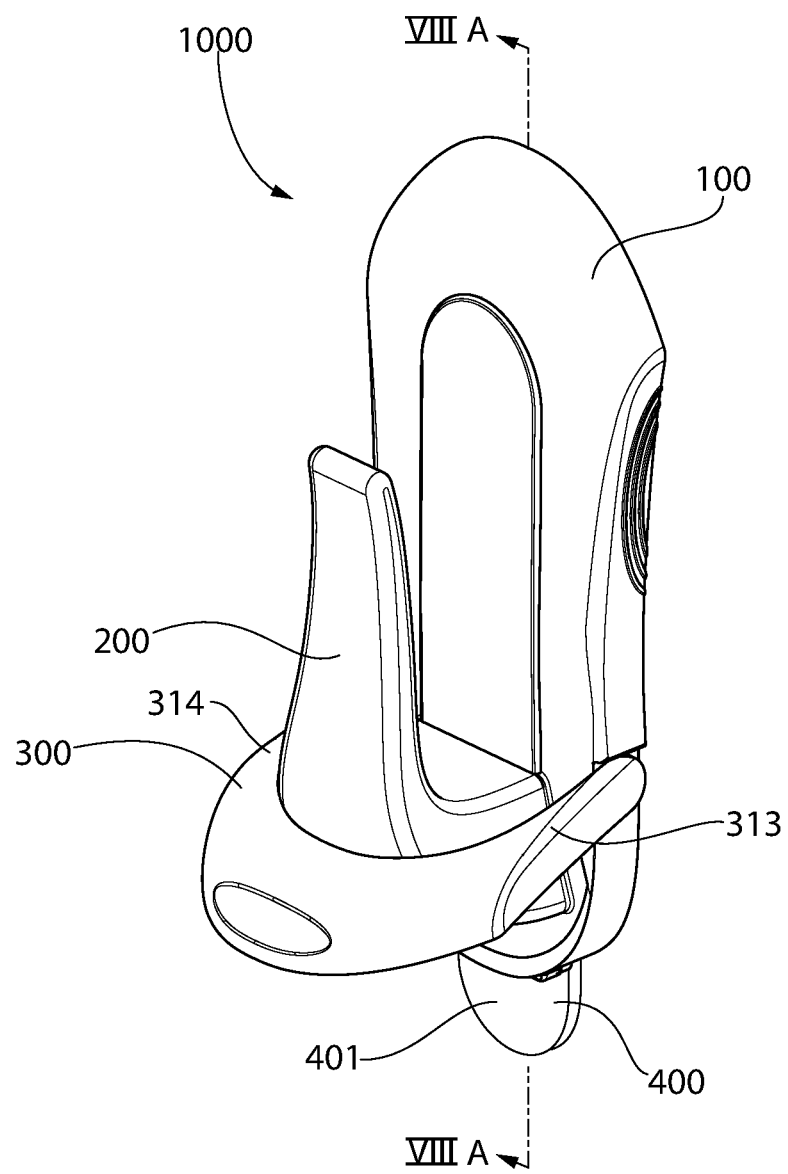
FIG. 5 is a front perspective view of the apparatus of FIG. 1 illustrating the access member of the apparatus in an open state.

The access member 300 can be pivoted relative to the support member 100 between a closed state, as illustrated in FIG. 1, and an open state, as illustrated in FIG. 5. Specifically, holding the support member 100 in a fixed position, a user can pivot or rotate the access member 300 about the first pivot axis B-B by gripping and rotating/pivoting the access member 300. The access member 300 has only one degree of freedom relative to the support member 100, the one degree of freedom being pivoting about the first pivot axis B-B. Thus, the access member 300 cannot be slid/translated in the direction of the longitudinal axis A-A or moved in any manner other than pivoting about the first pivot axis B-B. When installed, the support member 100 is secured to a surface, but the access member 300 remains freely pivotable relative to the support member 100 and relative to the surface. Thus, even in an installed state, the access member 300 can be pivoted about the first pivot axis B-B between the open and closed states. The stopper tab 133 prevents over-pivoting of the access member 300 in one rotational direction and the hook member 200 acts as a stop to prevent over-pivoting of the access member 300 in the opposite rotational direction, as discussed in more detail below with reference to FIGS. 7-8D.

The outer surface 316 of the first arm member 313 forms a first side surface 321 of the access member 300 while the outer surface 318 of the second arm member 314 forms a second side surface 322 of the access member 300. In the exemplified embodiment, each of the first and second side surfaces 321, 322 of the access member 300 are concave in the axial direction. In the closed state, as best seen in FIG. 3, the concave first side surface 321 of the access member 300 is aligned with the concave first side surface 105 of the support member 100 while the concave second side surface 322 of the access member 300 is aligned with the concave second side surface 106 of the support member 100. The concave first side surface 321 of the access member 300 and the concave first side surface 105 of the support member 100 collectively form a singular contoured, and more specifically concave, surface that defines a first depression 140. Thus, there is a smooth transition from the concave first side surface 321 of the access member 300 to the concave first side surface 105 of the support member 100. The concave second side surface 322 of the access member 300 and the concave second side surface 106 of the support member 100 collectively form a singular contoured, and more specifically concave, surface that defines a second depression 141. Thus, there is a smooth transition from the concave second side surface 322 of the access member 300 to the concave second side surface 106 of the support member 100.

The first and second depressions 140, 141 collectively define a narrowed waist section 143 of the apparatus 1000. Furthermore, due to the concave shapes of the first and second side surfaces 105, 106 of the support member 100, the first and second side surfaces 105, 106 of the support member 100 form a first flared section 144 of the apparatus 1000. Moreover, due to the concave shapes of the first and second side surfaces 321, 322 of the access member 300, the first and second side surfaces 321, 322 of the access member 300 form a second flared section 145 of the apparatus 1000. The first and second flared sections 144, 145 are transversely widened relative to the waist section 143. Specifically, the first flared section 142 is a transversely widened portion of the apparatus 1000 (relative to the waist section 143) that facilitates gripping of the support member 100 during stretching of the stretch-release adhesive tape member 400 to release the support member 100 from the surface upon which it is mounted as discussed in more detail below with reference to FIGS. 8A-8D.

Moreover, in the exemplified embodiment the first and second gripping features 107, 108 are located within the first flared section 144. Specifically, the first and second gripping features 107, 108 are located between the waist section 143 and the upper end 103 of the support member 100 on the first and second side surfaces 105, 106 of the support member 100, respectively. Thus, the increased width of the first flared section 144 in combination with the first and second gripping features 107, 108 located thereon results in increased ability of a user to maintain a grip on the support member 100 while disengaging the stretch-release adhesive 400 from the surface on which it is mounted as discussed in more detail below.

As best seen in FIG. 3, in the exemplified embodiment the first pivot axis B-B is located at a first distance D1 from the upper end 103 of the support member 100. Furthermore, the lowermost surface 203 of the proximal end 202 of the base portion 201 of the hook member 200 is located a second distance D2 from the upper end 103 of the support member 100. In the exemplified embodiment, the second distance D2 is greater than the first distance D1. Thus, the first pivot axis B-B is located between the lowermost surface 203 of the proximal end 202 of the base portion 201 of the hook member 200 and the upper end 103 of the support member 100. Furthermore, in the exemplified embodiment the uppermost surface 204 of the proximal end 202 of the base portion 201 of the hook member 200 is located a third distance D3 from the upper end 103 of the support member 100. The third distance D3 is greater than the first distance D1 and less than the second distance D2. Thus, the first pivot axis B-B is located between the lowermost surface 203 of the proximal end 202 of the base portion 201 of the hook member 200 and the upper end 103 of the support member 100. The first pivot axis B-B is also located between the uppermost surface 204 of the proximal end 202 of the base portion 201 of the hook member 200 and the upper end 103 of the support member 100.

Referring briefly to FIGS. 1 and 5 concurrently, the pivoting movement of the access member 300 will be briefly described, with a more thorough description of this movement being provided below with reference to FIGS. 7-8B. FIG. 1 illustrates the access member 300 in the closed state. In the closed state, the cover portion 310 of the access member 300 extends beyond the lower end 104 of the support member 100 (see also FIG. 3) while the first and second arm members 313, 314 are transversely aligned with the support member 100. As a result and as explained in more detail below, the cover portion 310 of the access member 300 covers or hides/conceals from view the gripping portion 401 of the stretch-release adhesive tape member 400. While maintaining the support member 100 still/fixed, the access member 300 can be pivoted about the first pivot axis B-B into the position illustrated in FIG. 5, which is the open position. As seen in FIG. 5, in the open position the gripping portion 401 of the stretch-release adhesive tape member 400 is visible and accessible to a user (at least partially exposed) so that a user can pull on the gripping portion 401 of the stretch-release adhesive tape member 400 to disengage the apparatus 1000 from a surface as desired. Furthermore, when in the open state, the hook member 200 at least partially nests between the first and second arm members 313, 314 of the access member 300 (as seen in FIGS. 5, 8A, and 8B).

Figure 7:
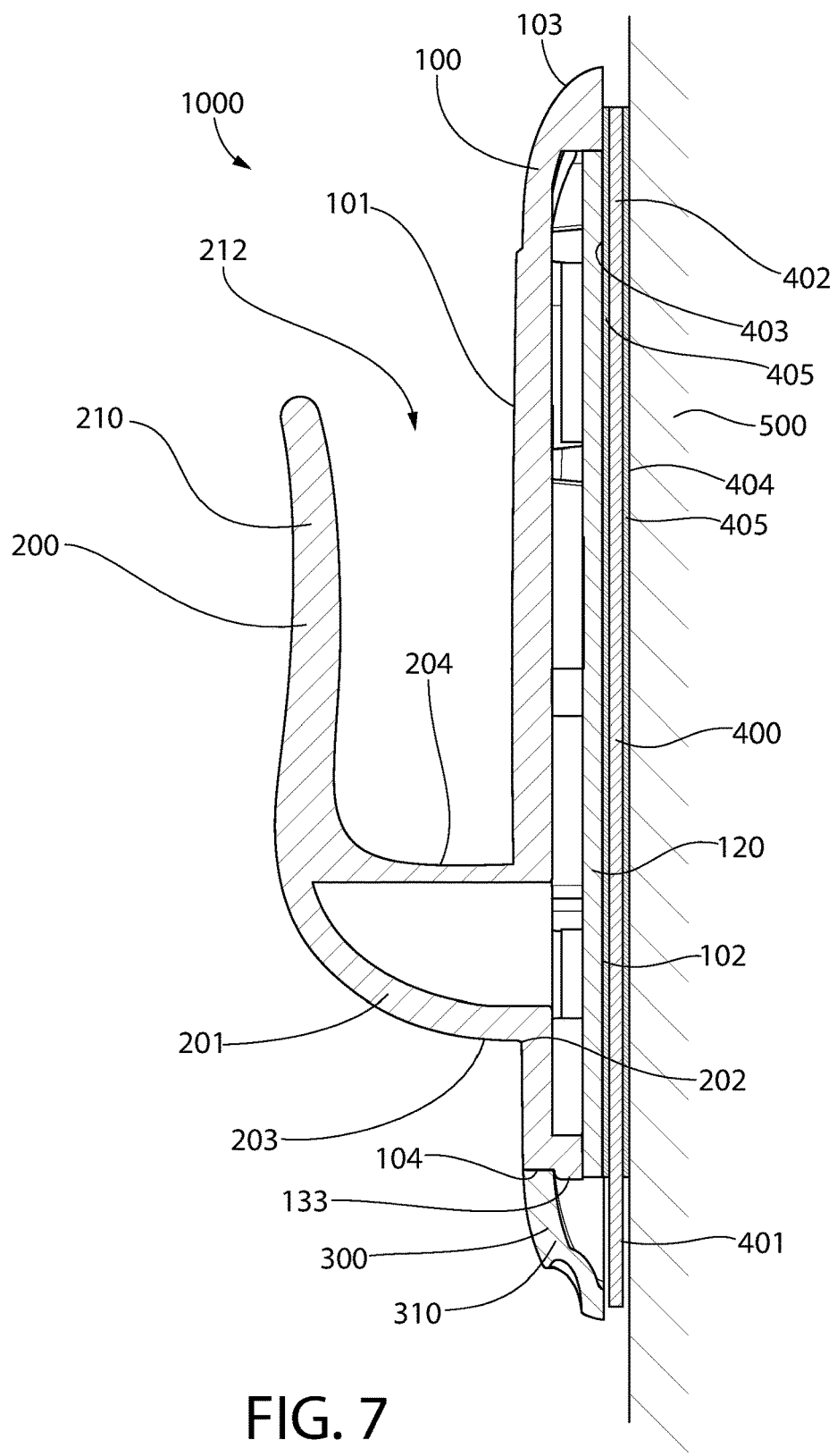
FIG. 7 is a cross-sectional view taken along line VII of FIG. 1.

Referring now to FIG. 7, the apparatus 1000 is illustrated in cross-section mounted to a surface 500, such as a wall. The steps for mounting the apparatus 1000 to the surface 500 are as follows. First, any release paper that is secured to the rear surface 404 of the adhesive portion 402 of the stretch-release adhesive tape member 400 is removed. Next, the rear surface 404 of the adhesive portion 402 of the stretch-release adhesive tape member 400 is placed at a desired location on the surface 500. Once so positioned, any release paper that is secured to the front surface 403 of the adhesive portion 402 of the stretch-release adhesive tape member 400 is removed to expose the adhesive material 405 thereon. Next, the rear surface 102 of the support member 100 of the apparatus 1000 is moved into contact with the exposed adhesive material 405 on the front surface 403 of the stretch-release adhesive tape member 400 to mount the support member 100 to the stretch-release adhesive tape member 400 and hence also to the surface 500.

The support member 100 is mounted to the stretch-release adhesive tape member 400 at a location so as to ensure that at least a portion of the gripping portion 401 of the stretch-release adhesive tape member 400 extends longitudinally beyond the lower end 104 of the support member 100. Preferably, the length of the portion of the gripping portion 401 of the stretch-release adhesive tape member 400 that extends beyond the lower end 104 of the support member 100 is less than the axial length of the cover portion 310 of the access member 310. As a result, when the access member 300 is closed, it conceals the portion of the gripping portion 401 of the stretch-release adhesive tape member 400 that extends beyond the lower end 104 of the support member 100. It is preferable that no portion of the stretch-release adhesive tape member 400 extends axially beyond the upper end 103 of the support member 100.

When mounting the support member 100 to the stretch-release adhesive tape member 400 it should be ensured that the access member 300 is not in direct contact with the adhesive material 300 so as not to prevent pivoting movement of the access member 300 as described herein. Rather, the access member 300, and more specifically the cover portion 310 thereof, is in contact with or at least covers/conceals at least a portion of the gripping portion 401 of the stretch-release adhesive tape member 400. Thus, when the support member 100 is mounted to the stretch-release adhesive tape member 400, the entirety of the stretch-release adhesive tape member 400 is concealed from view (the adhesive portion 402 is concealed by the support member 100 and the gripping portion 401 is concealed by the access member 300). This enhances the aesthetic appeal of using the apparatus 1000 because only the support member 100, the hook member 200, and the access member 300 are exposed to view while the stretch-release adhesive tape member 400 is hidden from view.

Figure 8A:
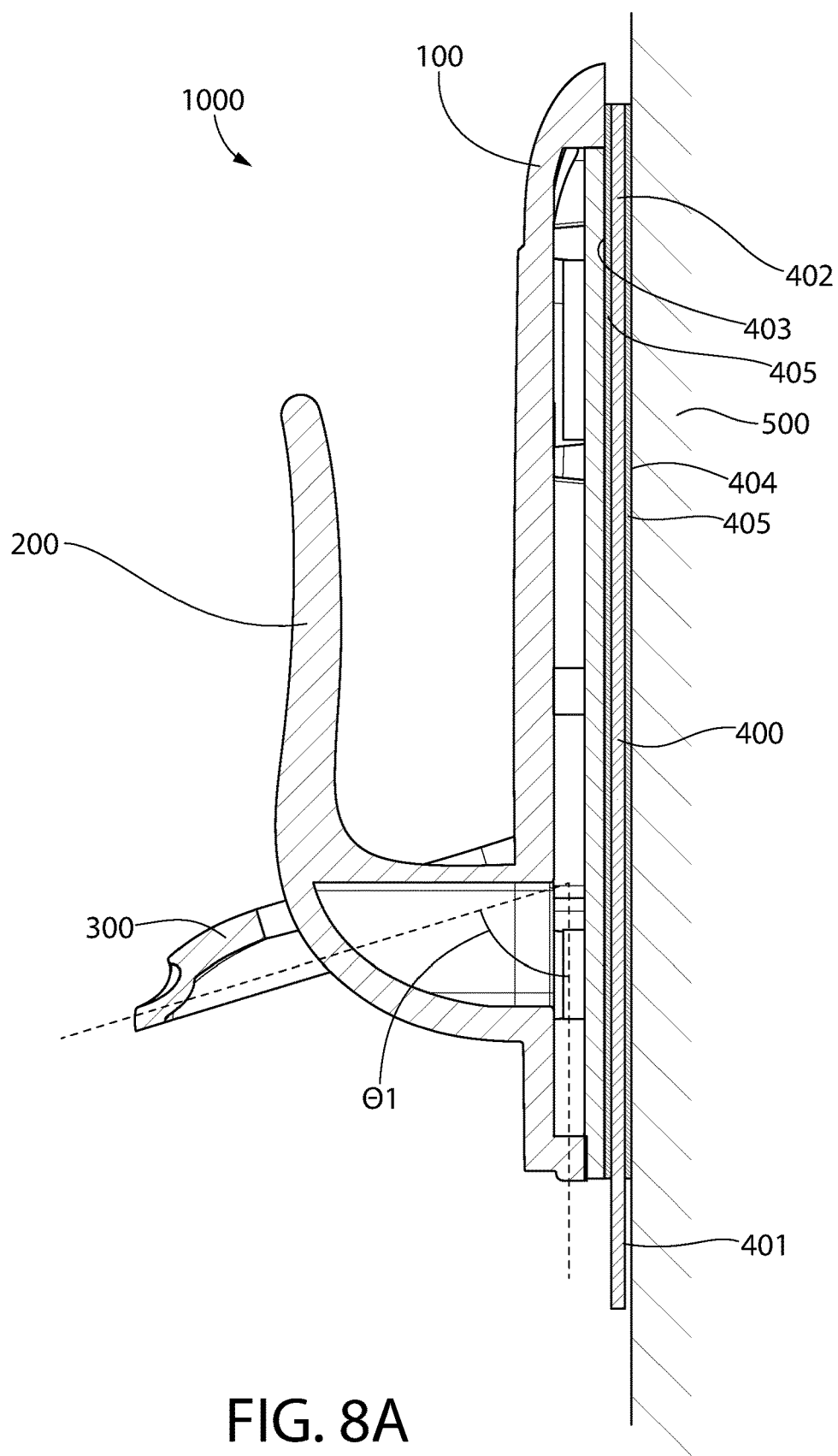
FIG. 8A is a cross-sectional view taken along line VIII of FIG. 5.
Figure 8B:
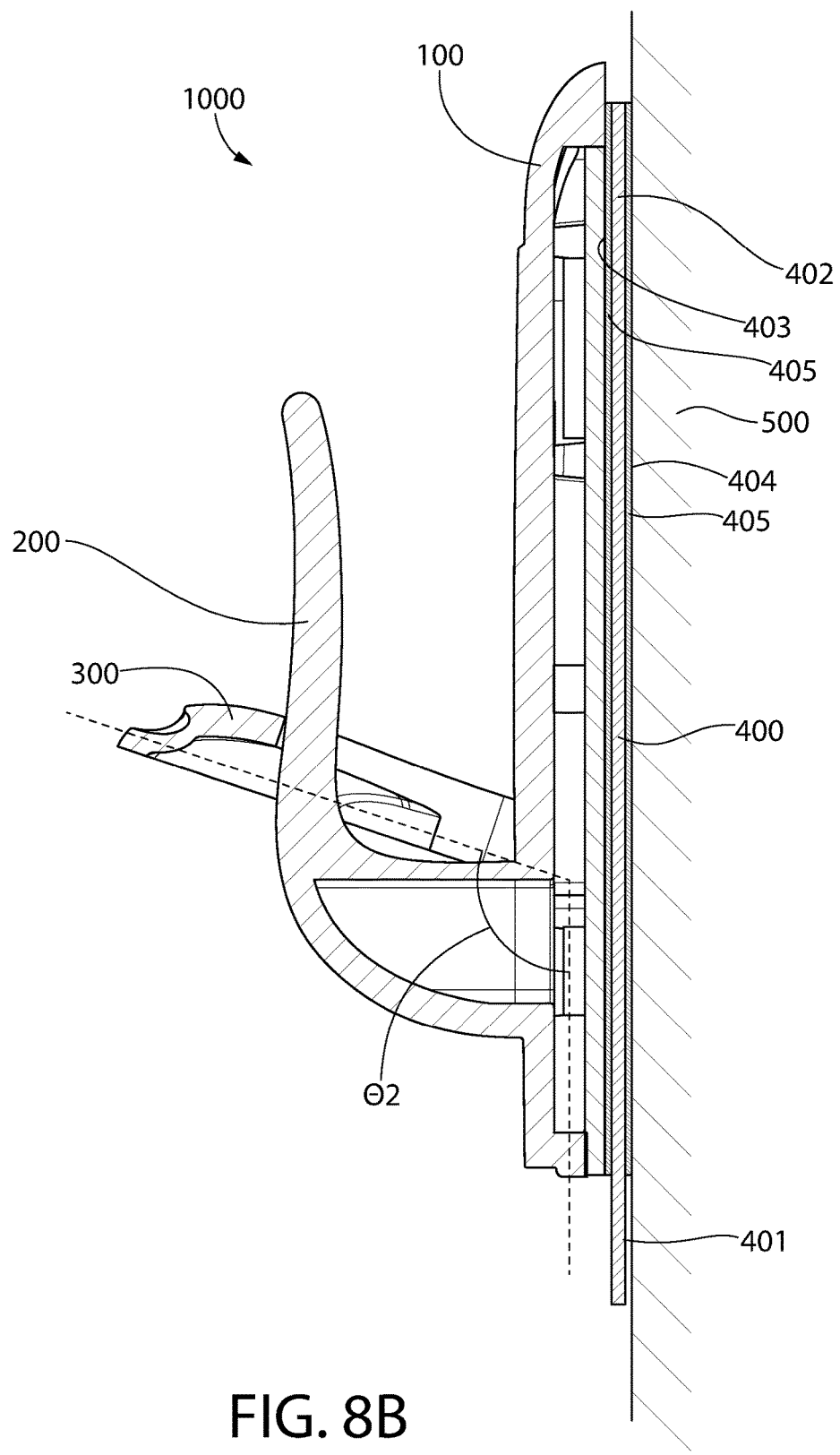
FIG. 8B is a cross-sectional view taken along line VIII of FIG. 5 in accordance with an alternative embodiment of the present invention.

Referring to FIG. 8A, when it is desired to remove the apparatus 1000 from the surface 500, the user must gain access to the gripping portion 401 of the stretch-release adhesive tape member 400. To do this, the user pivots the access member 300 relative to the support member 100 as discussed above to expose the gripping portion 401 of the stretch-release adhesive tape member 400. Specifically, because the support member 100 is secured to the adhesive material 405 of the stretch-release adhesive tape member 400, which in turn is mounted to the surface 500, when a user grips the access member 300 and pivots it about the first pivot axis B-B, the access member 300 will pivot relative to the support member 100 about the first pivot axis B-B while the support member 100 remains in a fixed position.

FIG. 8A illustrates the access member 300 fully pivoted relative to the support member 100 in accordance with one embodiment of the present invention. Specifically, in this embodiment the access member 300 is configured to pivot to an angle θ1, which is between 70° and 80°, or more specifically between 72° and 74° relative to the support member 100 before it contacts the hook member 200 and is prevented from further pivoting. FIG. 8B illustrates the access member 300 fully pivoted relative to the support member 100 in accordance with another embodiment of the present invention. Specifically, in this embodiment the access member 300 is configured to pivot to an angle θ2, which is between 100° and 115°, and more specifically between 107° and 110° relative to the support member 100 before it contacts the hook member 200 and is prevented from further pivoting. In one embodiment, the access member 100 is configured to pivot an angle of at least 90° when moved from the closed state to the fully open state. In another embodiment, the access member 100 is configured to pivot an angle of at least 50°, or at least 60°, or at least 70° relative to the support member 100.

In both of the embodiments illustrated above in FIGS. 8A and 8B, when the access member 300 is pivoted into the fully open state, the gripping portion 401 of the stretch-release adhesive tape member 400 is at least partially exposed. Thus, in this position a user can grip the gripping portion 401 of the stretch-release adhesive tape member 400 to remove it from the surface 500, as discussed below with reference to FIGS. 8C and 8D. However, it should be noted that the access member 300 does not necessarily need to be pivoted to the fully open position in order to provide a user with access to the gripping portion 401 of the stretch-release adhesive tape member 400. The access member 300 need only be pivoted about the first pivot axis B-B a sufficient degree/amount to enable a user to gain access to the gripping portion 401 of the stretch-release adhesive tape member 400. It might be that pivoting an angle of 20°, or 30°, or 40° is sufficient to achieve this goal. However, the exact degree of pivoting required for a user to be capable of accessing the gripping portion 401 of the stretch-release adhesive tape member 400 may be dictated in part by the size of the particular user's hand and/or fingers and thus there is no set amount of pivoting that is required to enable removal of the apparatus 1000 from the surface 500.

Figures 8C, 8D:
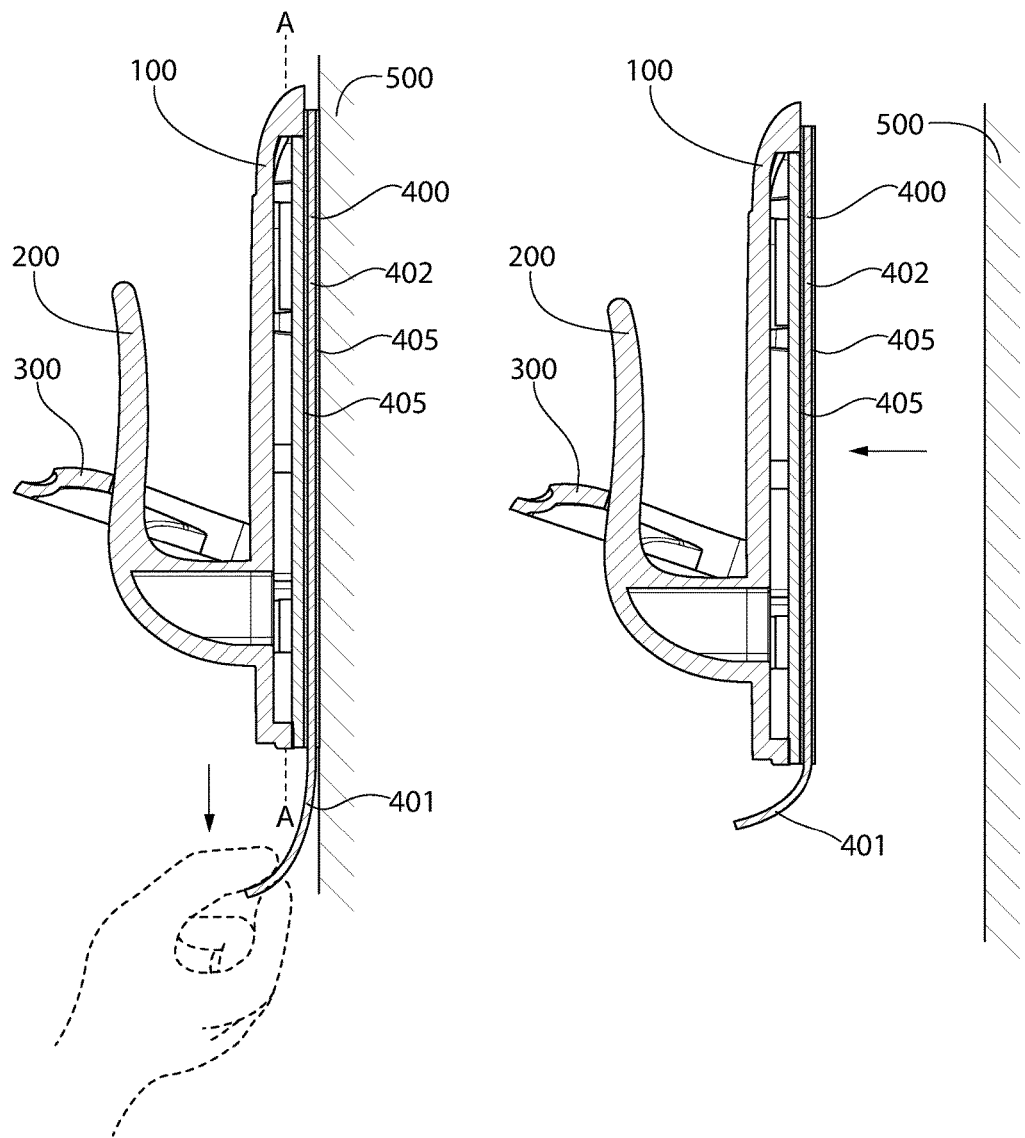
FIGS. 8C and 8D are cross-sectional schematic views illustrating a user removing the apparatus from a surface.

Referring to FIGS. 8C and 8D, regardless of the degree/amount that the access member 300 is pivoted relative to the support member 100, it is pivoted until the gripping portion 401 of the stretch-release adhesive tape member 400 is at least partially exposed. Once so exposed, a user can grip the gripping portion 401 of the stretch-release adhesive tape member 400 as illustrated in FIG. 8C. Because the gripping portion 401 of the stretch-release adhesive tape member 400 is free of adhesive on both of its opposing surfaces, it can be readily gripped by a user's fingers (it does not stick to the surface 500 but is readily gripped on both its front and rear surfaces as shown in FIG. 8C). The user can then pull downwardly on the stretch-release adhesive tape member 400 in the direction of the longitudinal axis A-A. This downward pulling/stretching of the stretch-release adhesive tape member 400 causes the stretch-release adhesive tape member 400 to separate from the surface 500 upon which it is mounted. Thus, as shown in FIG. 8D, pulling on the stretch-release adhesive tape member 400 in a downward axial direction (along the longitudinal axis A-A) will result in the apparatus 1000 in its entirety being separated/removed from the surface 500.

As noted above, while a user is pulling on the gripping portion 401 of the stretch-release adhesive tape member 400, it may be beneficial for the user to also grip the first flared section 144 formed by the curved/concave side walls 105, 106 of the support member 100 to support the apparatus 1000 during this removal procedure. The curved nature of the flared section 144 along with the first and second gripping features 107, 108 thereon enhances a user's ability to maintain a grip on the support member 100 while the user is pulling/stretching the stretch-release adhesive tape member 400 during removal. Specifically, the flaring shape of the side surfaces will make it more difficult for the support member 100 to slip out of a user's grip when it eventually releases from the surface 500. The benefits of enhancing the user's grip on the support member 100 during removal as described herein should be readily apparent to persons skilled in the art.

Figure 9:
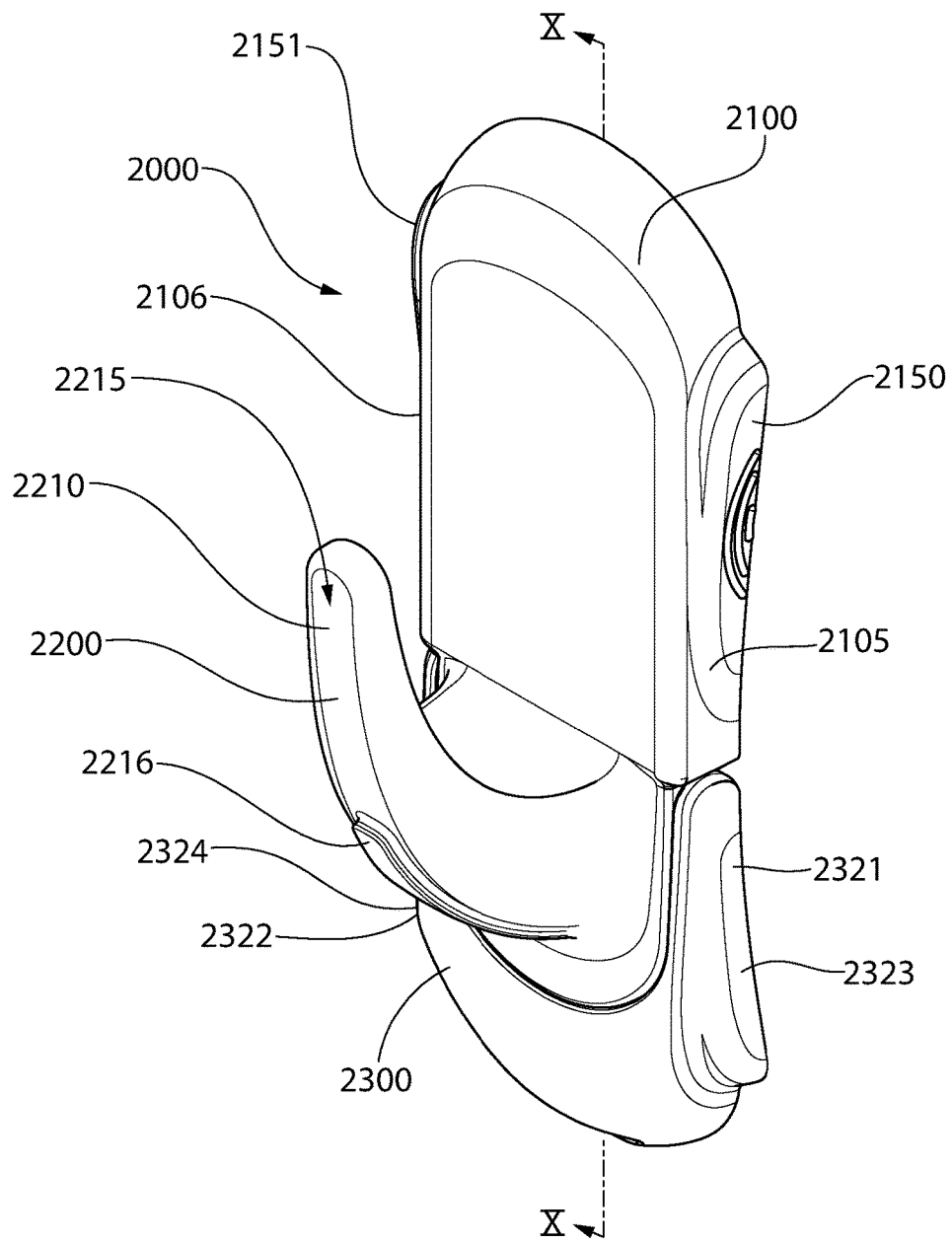
FIG. 9 is a front perspective view of an apparatus for supporting articles in accordance with another embodiment of the present invention.
Figure 10:
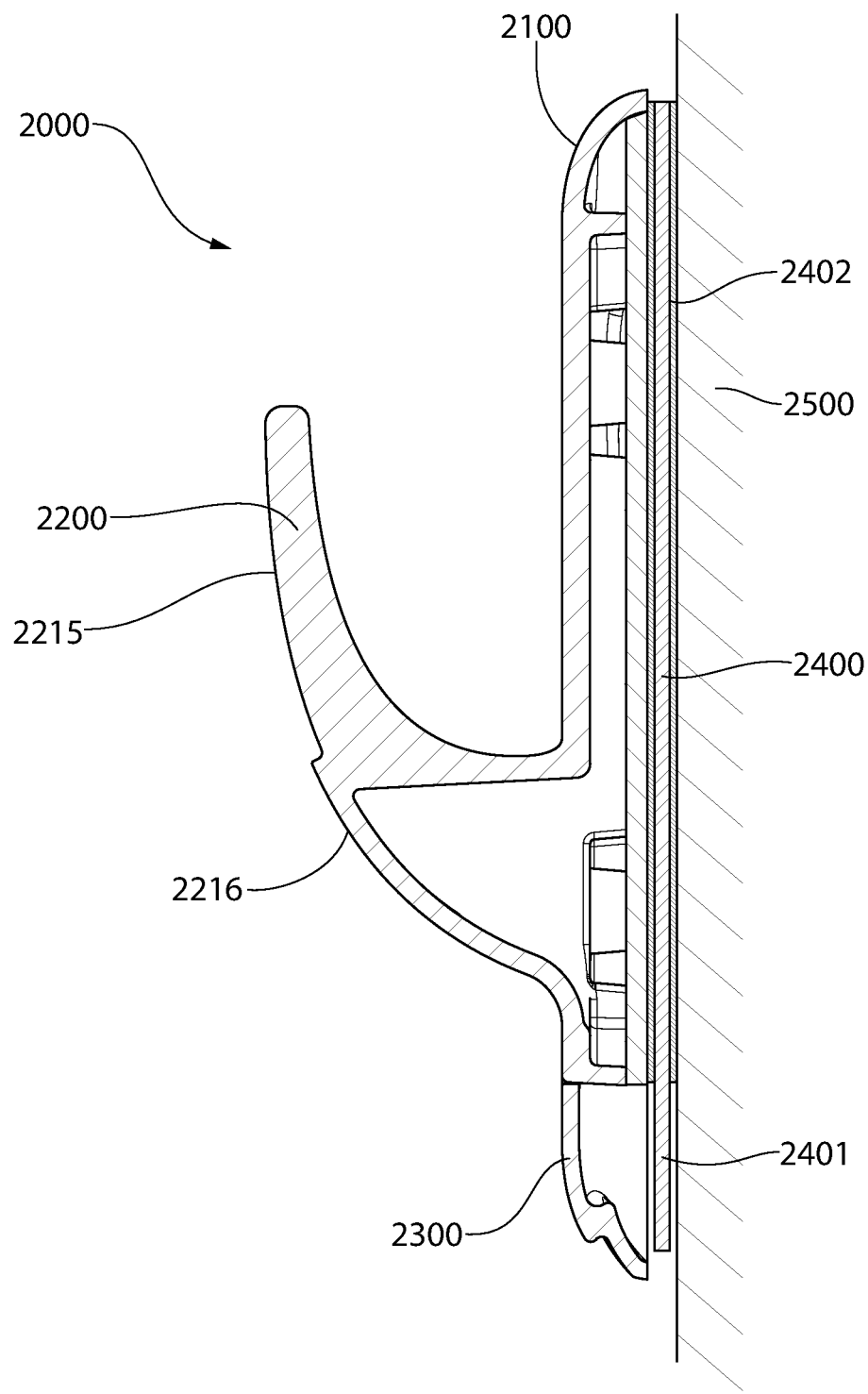
FIG. 10 is a cross-sectional view taken along line X-X of FIG. 9 with an access member of the apparatus in a closed state.
Figure 11:
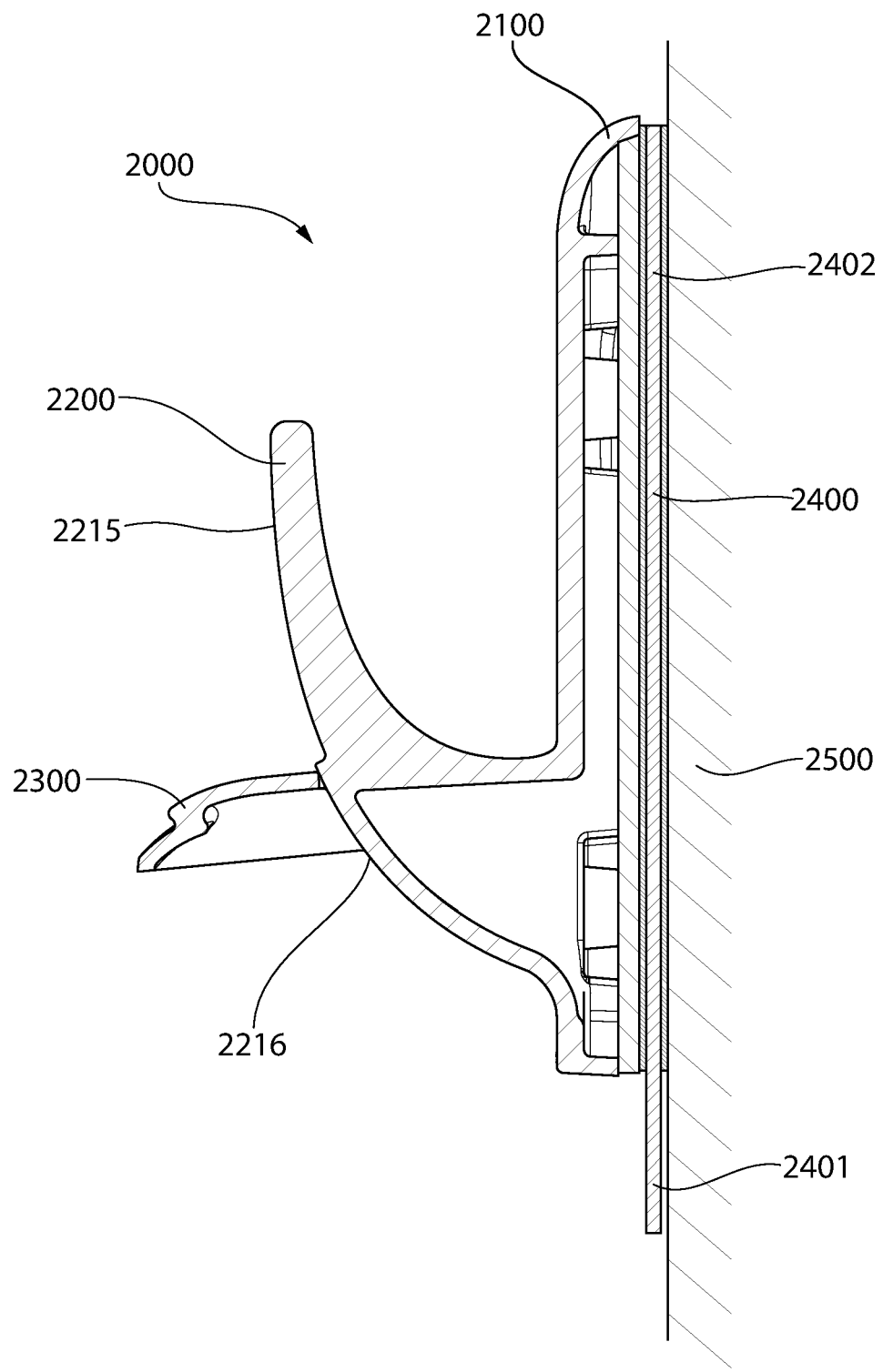
FIG. 11 is a cross-sectional view taken along line X-X of FIG. 9 with the access member of the apparatus in an open state.

Referring to FIGS. 9-11, an apparatus 2000 for supporting articles will be described in accordance with another embodiment of the present invention. The apparatus 2000 is similar to the apparatus 1000 in many respects, and thus only the differences will be described in detail herein. For features of the apparatus 2000 that are similar to the apparatus 1000, the same reference numerals will be used except that the prefix "2" will be added to the numeral when describing the apparatus 2000. For features of the apparatus 2000 that are numbered and not described, the description of the similar feature of the apparatus 1000 should be considered applicable.

The apparatus 2000 generally comprises a support member 2100, a hook member 2200 extending from the support member 2100, an access member 2300 pivotably coupled to the support member 2100, and a stretch-release adhesive tape member 2400 having a gripping portion 2401 and an adhesive portion 2402. The access member 2300 is pivotably coupled to the support member 2100 in much the same manner as the access member 300 is coupled to the support member 100 of the apparatus 1000.

The differences between the apparatus 2000 and the apparatus 1000 are as follows. The support member 2100 comprises a first side surface 2105 and an opposite second side surface 2106. In this embodiment, the first side surface 2105 comprises a first elongated extension 2150 and the second side surface 2106 comprises a second elongated extension 2151. Each of the first and second elongated extensions 2150, 2151 is concave in the axial direction (similar to the first and second side surfaces 105, 106 of the support member 100). Furthermore, in this embodiment the access member 2300 comprises a first side surface 2321 and an opposite second side surface 2322. The first side surface 2321 comprises a first elongated extension 2323 and the second side surface 2322 comprises a second elongated extension 2324. Each of the first and second elongated extensions 2323, 2324 is concave in the axial direction.

When the access member 2300 is in the closed state as illustrated in FIG. 9, the first side surface 2105 of the support member 2100 and the first side surface 2321 of the access member 2300 collectively form a singular concave surface. Similarly, the second side surface 2106 of the support member 2100 and the second side surface 2322 of the access member 2300 collectively form a singular concave surface. Thus, the same enhanced gripping as was described with reference to the apparatus 1000 and particularly the support member 100 thereof is also applicable in this embodiment.

Another difference is that in this embodiment there is an elongated protrusion 2216 extending from the outer facing surface 2215 of the retaining portion 2210 of the hook member 2200. The elongated protrusion 2216 operates as a stop mechanism in that it contacts the access member 2300 during pivoting of the access member 2300 to prevent over-rotation thereof.

Referring to FIG. 10, the apparatus 2000 is illustrated mounted to a surface 2500 such as a wall with the access member 2300 in the closed state. Mounting of the apparatus 2000 to the surface 2500 is achieved in the same manner as mounting the apparatus 1000 to the surface 500 which was described in detail below. Specifically, the stretch-release adhesive tape member 2400 is mounted to the surface 2500, and then the support member 2100 is mounted to the stretch-release adhesive tape member 2400. With the access member 2300 in the closed state, the entirety of the stretch-release adhesive tape member 2400 including the gripping portion 2401 thereof is covered.

Referring to FIG. 11, the apparatus 2000 is illustrated mounted to the surface 2500 with the access member 300 pivoted to the open state. As with the previous embodiment, to pivot the access member 300 to the open state, a user will grip and rotate/pivot the access member 300 a desired amount or until it can no longer be pivoted. In this embodiment, the access member 300 can be pivoted until it contacts the elongated protrusion 2216 of the hook member 2200. The access member 2300 may be pivoted approximately between 80° and 90°, and more specifically between 82° and 88°, and still more specifically between 83° and 86° relative to the support member 2100 when pivoting from the closed state to the open state. Of course, the access member 2300 does not need to be pivoted to the fully open position but need only be pivoted a sufficient amount to expose a portion of the gripping portion 2401 of the stretch-release adhesive tape member 2400 so that it can be gripped and pulled by a user to detach the apparatus 2000 from the surface 2500. Removal of the apparatus 2000 from the surface 2500 is achieved in the same manner as removal of the apparatus 1000 as described above with reference to FIGS. 8A-8D.

Figure 12:
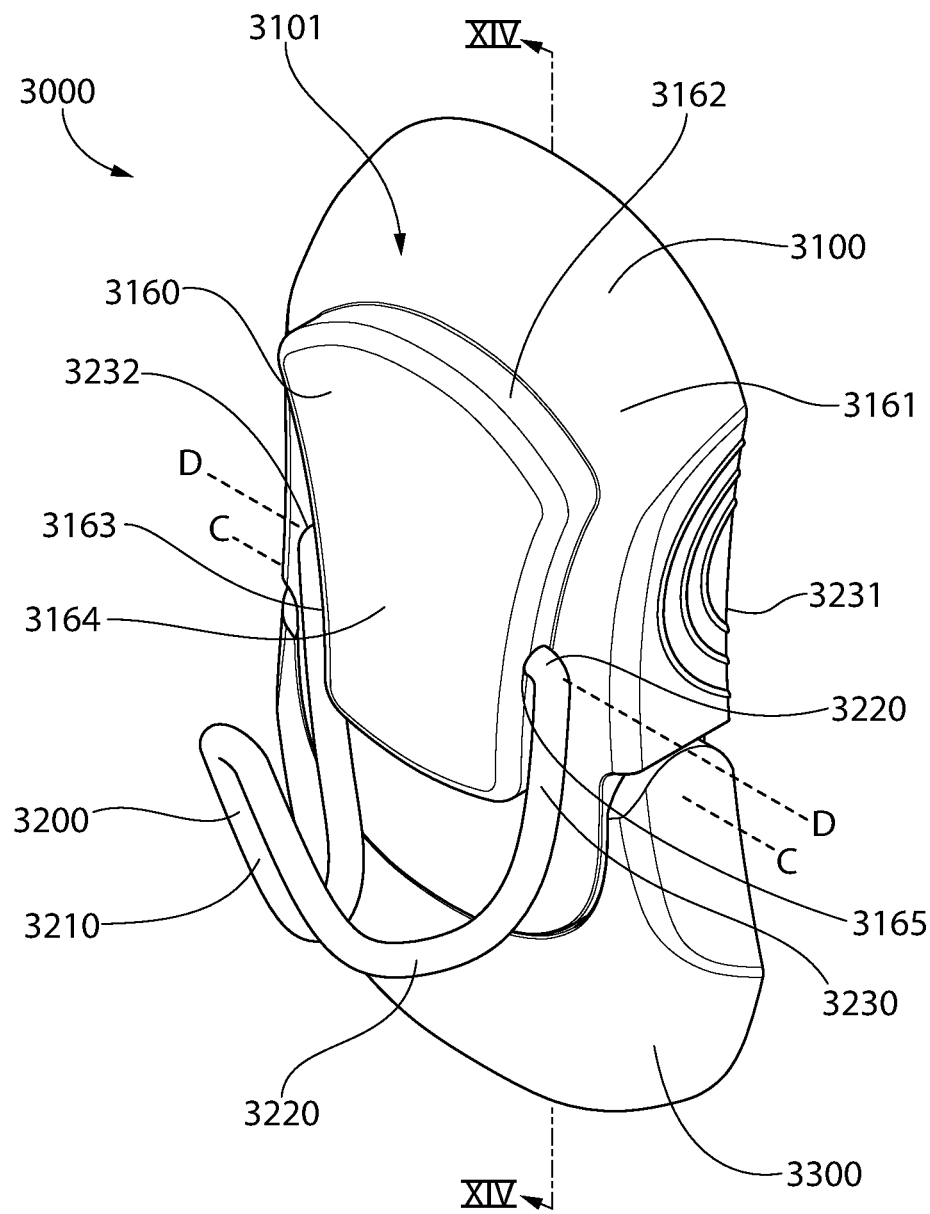
FIG. 12 is a front perspective view of an apparatus for supporting articles in accordance with yet another embodiment of the present invention.
Figure 13:
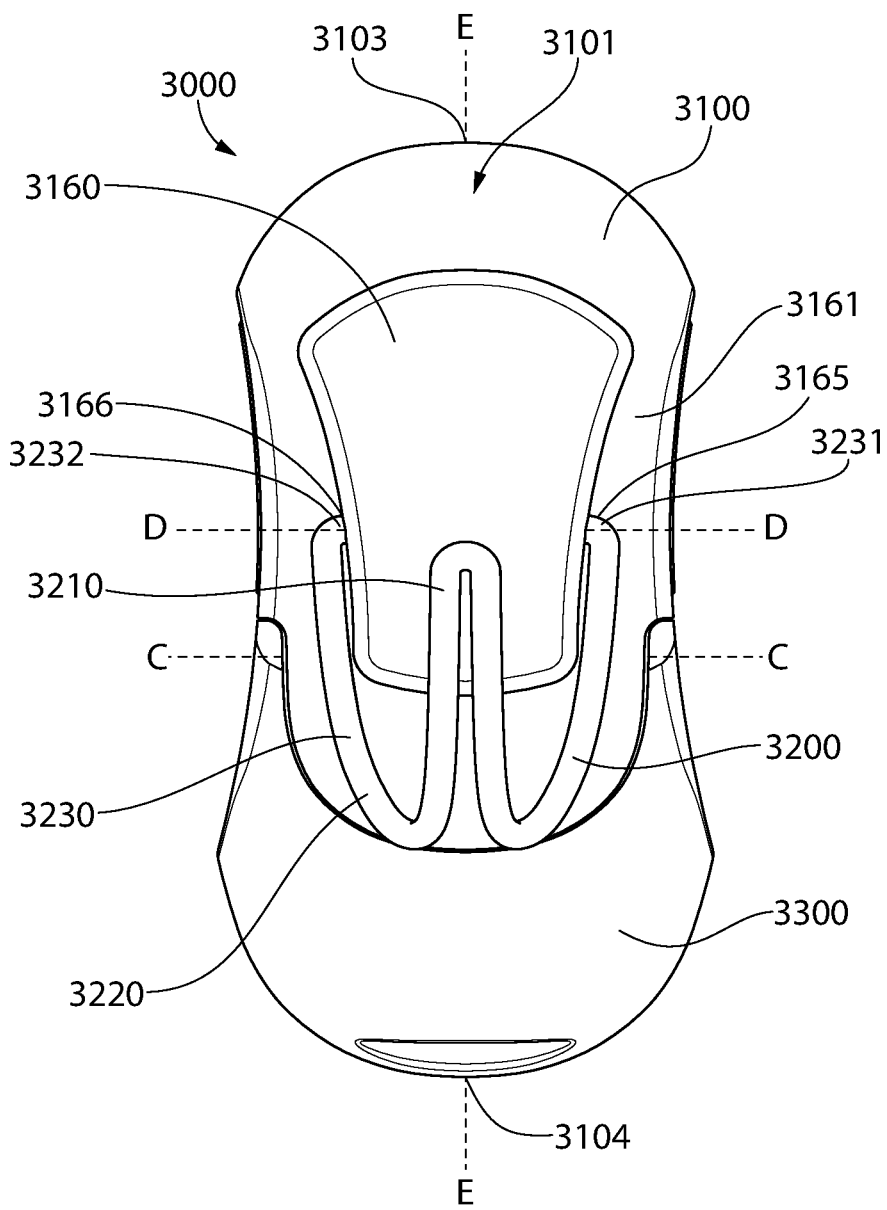
FIG. 13 is a front view of the apparatus of FIG. 12.

Referring to FIGS. 12 and 13, an apparatus 3000 for supporting articles will be described in accordance with another embodiment of the present invention. The apparatus 3000 is quite similar to the apparatus 1000 in many respects, and thus only the differences will be described in detail herein. For features of the apparatus 3000 that are similar to the apparatus 1000, the same reference numerals will be used except that the prefix "3" will be added to the numeral when describing the apparatus 3000. For features of the apparatus 3000 that are numbered and not described, the description of the similar feature of the apparatus 1000 should be considered applicable.

Figure 14:
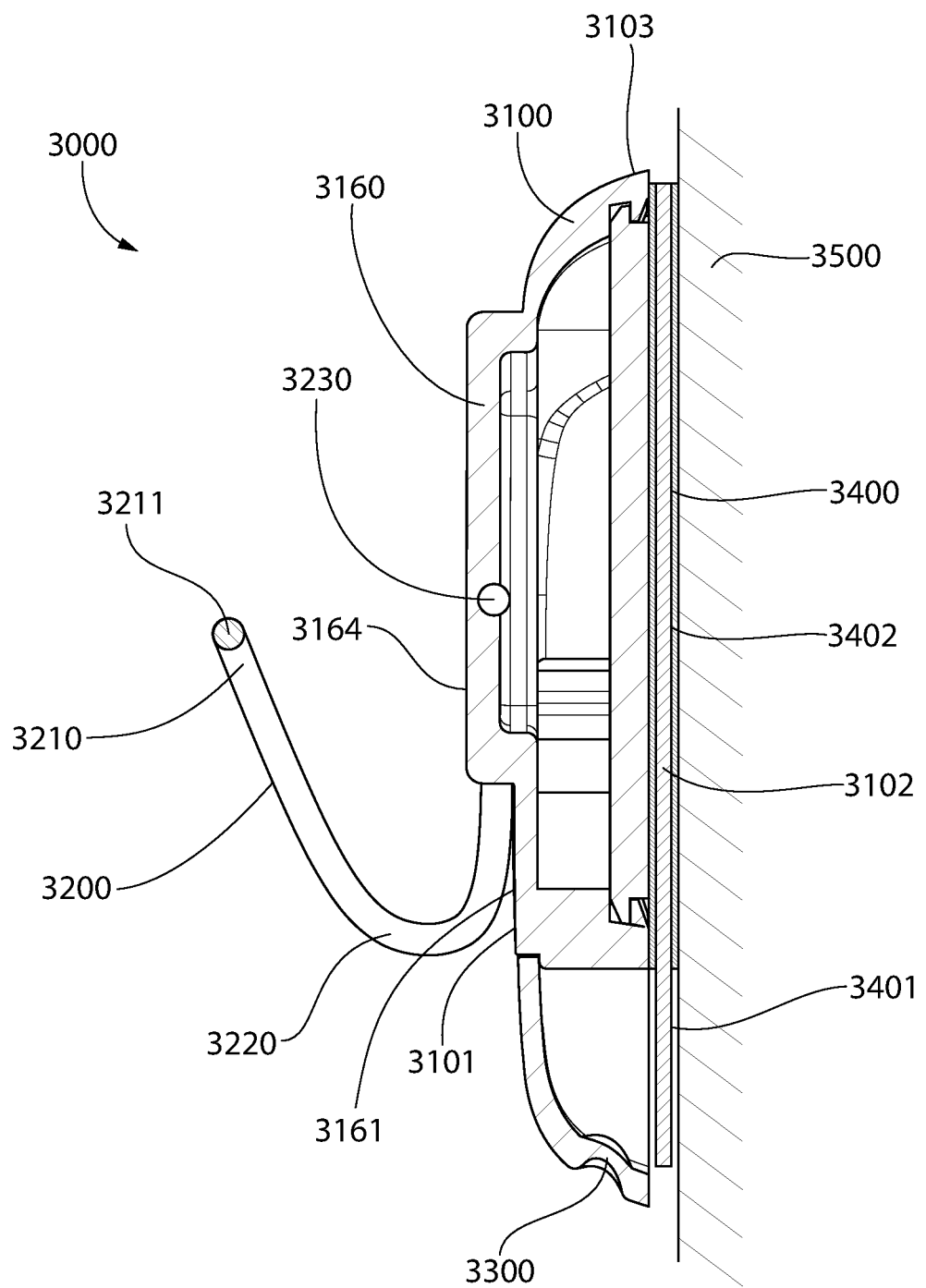
FIG. 14 is a cross-sectional view taken along line XIV-XIV of FIG. 12 with an access member of the apparatus in a closed state.
Figure 15:
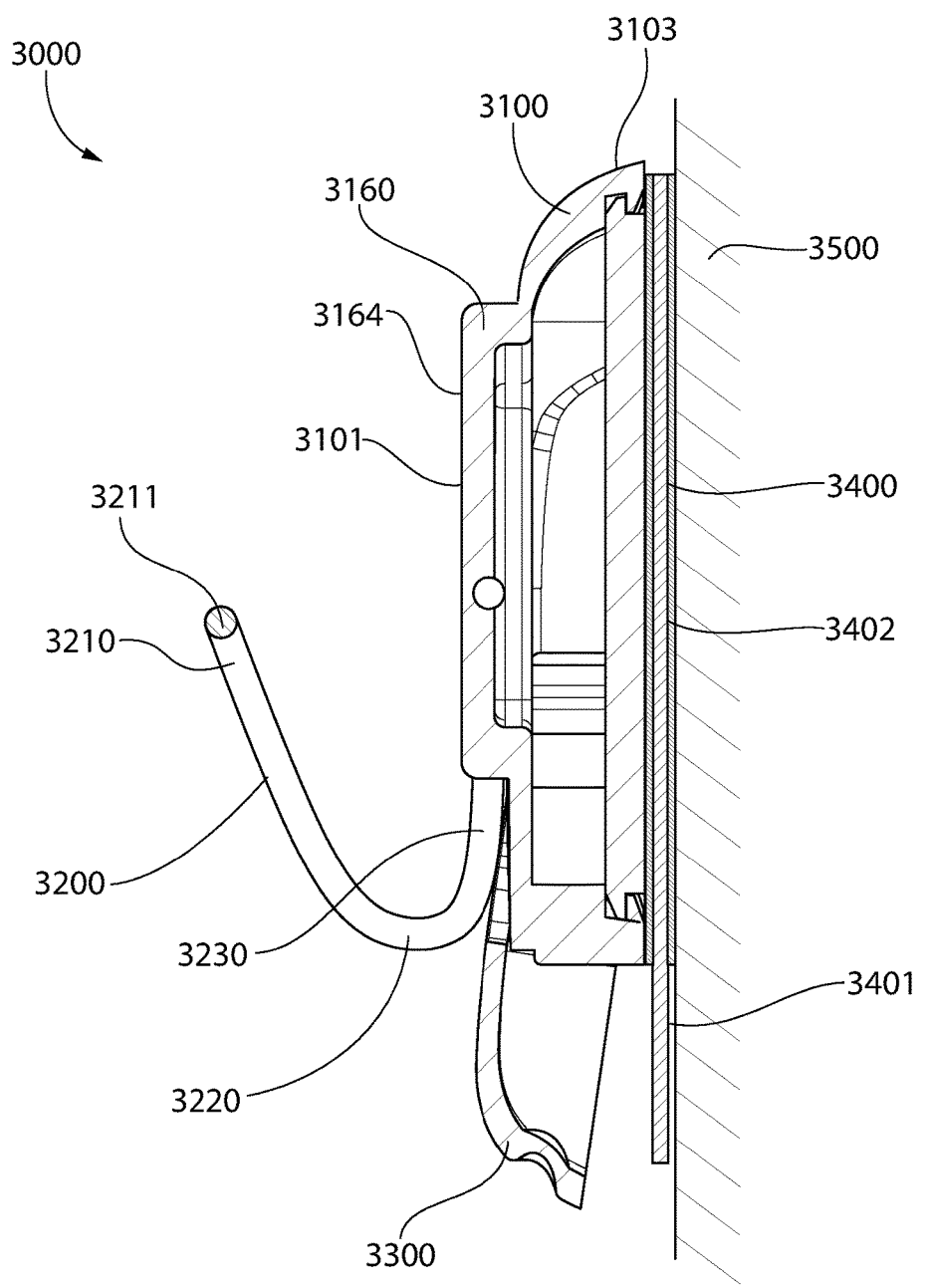
FIG. 15 is a cross-sectional view taken along line XIV-XIV of FIG. 12 with the access member of the apparatus in a partially open state.
Figure 16:
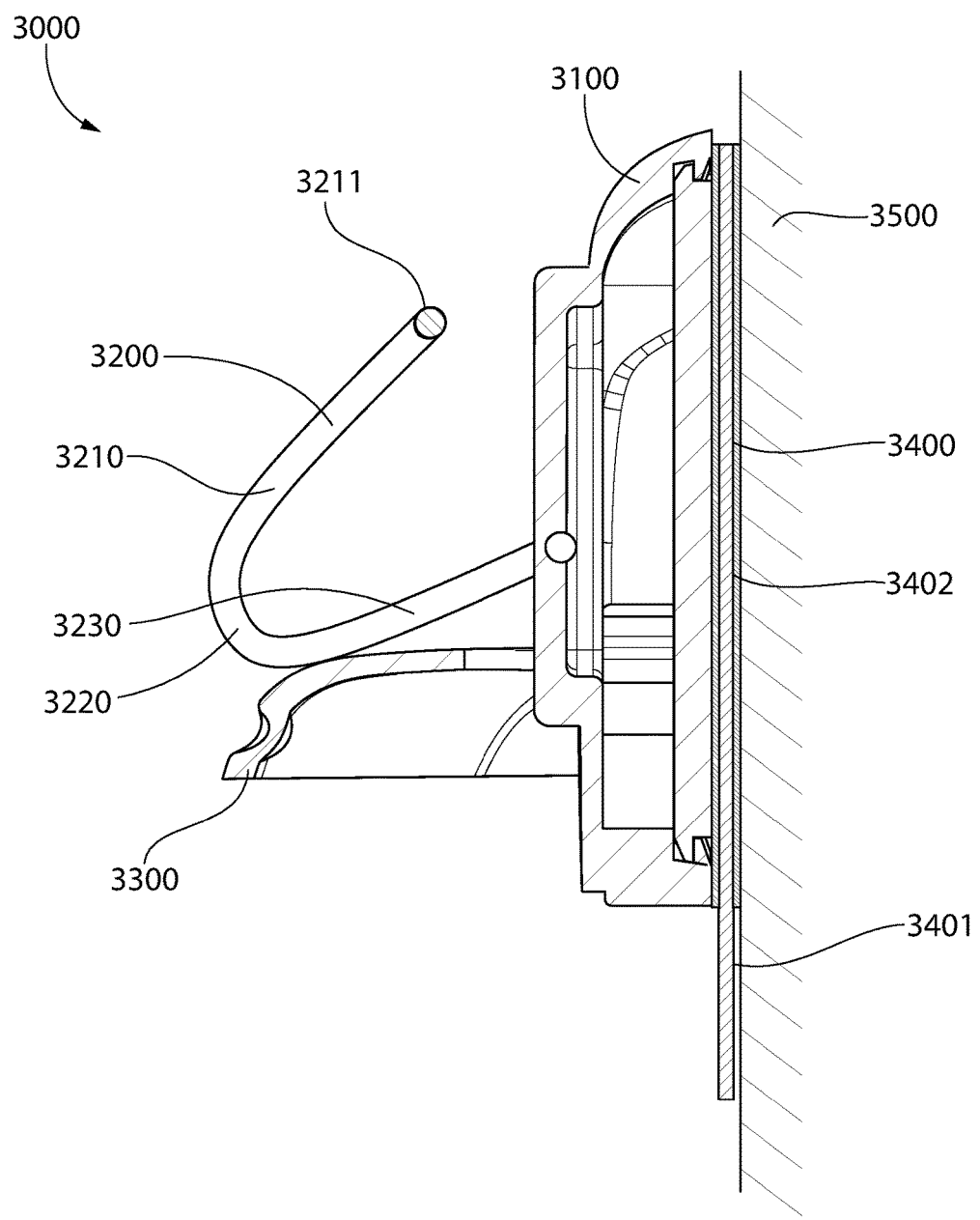
FIG. 16 is a cross-sectional view taken along line XIV-XIV of FIG. 12 with the access member of the apparatus in a fully open state.

The apparatus 3000 generally comprises a support member 3100, a hook member 3200, an access member 3300, and a stretch-release adhesive tape member 3400 (shown in FIGS. 14-16). The access member 3300 is pivotably coupled to the support member 3100 about a first pivot axis C-C between a closed state (FIGS. 12-14) and an open state (FIG. 15) in much the same way that the access member 300 is pivotably coupled to the support member 100 as described above. Furthermore, the overall shape of the side surfaces of the support member 3100 and the access member 3300 when coupled together is similar to that which has been described above (i.e., concave with a waist portion and flared portions and gripping features on the flared portions).

One of the main differences in this embodiment is that the hook member 3200 is not fixedly coupled to the support member 3100. Rather, in this embodiment the hook member 3200 is pivotably coupled to the support member 3100 about a second pivot axis D-D that is substantially parallel to the first pivot axis C-C. The hook member 3200 is pivotably coupled to the support member 3100 about the second pivot axis D-D between a receiving state (illustrated in FIGS. 12-14) and a retracted state (illustrated in FIG. 16). The hook member 3200 is freely pivotable relative to the support member 3100 such that there is no mechanism locking the hook member 3200 in place. However, due to gravity the hook member 3200 is biased into the receiving state and can be forcibly moved into the retracted state by a user as described below.

In the exemplified embodiment, the hook member 3200 is a wire hook, although the invention is not to be so limited and the hook member 3200 may be plastic or the like. Furthermore, in the exemplified embodiment the hook member 3200 comprises a receiving portion 3210, a bight portion 3220, and a connecting portion 3230. The receiving portion 3210 and the bight portion 3220 collectively support or hold an article thereon while the connecting portion 3230 serves to couple the hook member 3200 to the support member 3100. The connecting portion 3230 comprises first and second inwardly extending posts 3231, 3232 that couple to the support member 3100 as described herein below.

In this embodiment, the support member 3100 comprises a front surface 3101 and an opposite rear surface 3102 and an upper end 3103 and an opposite lower end 3104. The support member 3100 extends along a longitudinal axis E-E between the upper and lower ends 3103, 3104. Each of the first and second pivot axes C-C, D-D is substantially perpendicular to the longitudinal axis E-E of the support member 3100.

The front surface 3101 of the support member 3100 comprises a raised portion 3160 that is circumscribed by a lowered portion 3161. Thus, the raised portion 3160 forms an island-like extension on the front surface 3101 of the support member 3100. The raised portion 3160 is defined by an upstanding wall 3162 that protrudes form the lowered portion 3161 of the front surface 3160. The upstanding wall 3162 terminates in a terminal surface 3163 that forms a front surface 3164 of the raised portion 3160. Furthermore, there are first and second apertures 3165, 3166 formed into the upstanding wall 3162 for coupling the book member 3200 thereto. Specifically, distal ends of the inwardly extending posts 3231, 3232 of the hook member 3200 are inserted into the first and second apertures 3165, 3166 to pivotably couple the hook member 3200 to the support member 3100. When pivotably coupled to the support member 3100 the hook member 3200 is freely pivotable about the second pivot axis D-D.

Referring to FIG. 14, the apparatus 3000 is illustrated mounted to a surface 3500 such as a wall via the stretch-release adhesive tape member 3400 in a similar manner to that which has been described above with regard to the earlier described embodiments. Specifically, the stretch-release adhesive tape member 3400 is first mounted to the surface 3500, and then the support member 3100 of the apparatus 3000 is mounted to the stretch-release adhesive tape member 3400. Of course, in other embodiments the stretch-release adhesive tape member 3400 may be mounted to the support member 3100 first to form the apparatus 3000, and then the apparatus 3000 may be mounted to the surface 3500 via the stretch-release adhesive tape member 3400. This alternative sequence of mounting steps is applicable to each embodiment described herein.

In FIG. 14, the apparatus 3000 is mounted to the surface 3500 with the access member 3300 in the closed state and the hook member 3200 in the receiving state. In this position, the apparatus 3000 is prepared and configured to receive an article so that the article can be supported/hung from the surface 3500 by the apparatus 3000. When the access member 3300 is in the closed state, the access member 3300 conceals the gripping portion 3401 of the stretch-release adhesive tape member 3400. Thus, with the access member 3300 in the closed state, the entirety of the stretch-release adhesive tape member 3400 is concealed from view.

When the access member 3300 is in the closed state and the hook member 3200 is in the receiving state as illustrated in FIG. 14, the connecting portion 3230 (or a portion thereof) of the hook member 3200 is in contact with the front surface 3101 of the support member 3100. Furthermore, in this position the bight portion 3220 of the hook member 3200 extends outwardly from the front surface 3101 of the support member 3100 and the receiving portion 3210 of the hook member 3200 extends upward from the bight portion 3220 toward the upper end 3103 of the support member 3100.

When it is desired to gain access to the gripping portion 3401 of the stretch-release adhesive tape member 3400 for any purpose, including detaching the apparatus 3000 from the surface 3500, a user will pivot the access member 3300 relative to the support member 3100 about the first pivot axis C-C. FIG. 15 illustrates the apparatus 3000 with the access member 3300 slightly pivoted about the first pivot axis C-C such that the access member 3300 begins to contact the hook member 3200. Specifically, as the access member 3300 is pivoted about the first pivot axis C-C, the access member 3300 contacts the hook member 3200 and causes the hook member 3200 to pivot about the second pivot axis D-D from the receiving state toward the retracted state. Of course, the hook member 3200 may be also be separately pivoted about the second pivot axis D-D without being contacted by the access member 3300. FIG. 15 illustrates the apparatus 3000 in the position of first contact between the access member 3300 and the hook member 3200.

Referring now to FIG. 16, the apparatus 3000 is illustrated with the access member 3300 in the fully pivoted position. Specifically, in the exemplified embodiment, the access member 3300 is capable of pivoting approximately 90° about the first pivot axis C-C before the access member 3300 can no longer be pivoted due to contact between the side surfaces of the access member 3300 and the side surfaces of the support member 3100. Although the access member 3300 can only be pivoted to the degree shown in FIG. 16 in the exemplified embodiment, the invention is not to be so limited and modifications to the shape/structure of the access member 3300 and the support member 3100 may permit only a lesser or a greater degree of pivoting of the access member 3300 relative to the support member 3100. Furthermore, it should be appreciated that the hook member 3200 is configured to continue pivoting about the second pivot axis D-D further than that shown in FIG. 16. Specifically, in a fully retracted state, the hook member 3200 may be pivoted about the second pivot axis D-D until the distal end 3211 of the receiving portion 3210 of the hook member 3200 contacts the front surface 3101 of the support member 3100.

Thus, for the apparatus 3000, pivoting of the access member 3300 about the first pivot axis C-C automatically results in pivoting of the hook member 3200 about the second pivot axis D-D due to contact between the access member 3300 and the hook member 3200 during such pivoting of the access member 3300. When the access member 3300 is pivoted into the open state as illustrated in FIG. 16, the gripping portion 3401 of the stretch-release adhesive tape member 3400 becomes at least partially exposed and accessible to a user so that a user can grip the gripping portion 3401 of the stretch-release adhesive tape member 3400 to detach the apparatus 3000 from the surface 3500 as has been described in detail herein.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An apparatus for supporting articles, the apparatus comprising:
   a stretch-release adhesive tape member having an adhesive portion and a gripping portion;
   a support member comprising:
      a rear surface configured to be mounted to a surface with the stretch-release adhesive tape member;
      a front surface opposite the rear surface;
      an upper end and a lower end, the support member extending between the upper and lower ends along a longitudinal axis;
   a hook member extending outward from the front surface of the support member and upward toward the upper end of the support member;
   an access member pivotably coupled to the support member so as to be pivotable, relative to the support member, about a first pivot axis between: (1) a closed-state; and (2) an open-state;
   wherein the first pivot axis is at a fixed position relative to the support member and oriented substantially perpendicular to the longitudinal axis;

wherein the access member has only one degree of freedom relative to the support member, the one degree of freedom being pivoting about the first pivot axis; and wherein the first pivot axis lies in a plane that is perpendicular to the longitudinal axis and that intersects the hook member.

2. The apparatus according to claim 1 further comprising: the hook member comprising:
   a base portion having a proximal end coupled to the front surface of the support member, the base portion extending outward from the front surface of the support member, the proximal end of the base portion having a lowermost surface and an uppermost surface;
   a retaining portion extending upward from a distal end of the base portion toward the upper end of the support member,
   the first pivot axis located at a first distance from the upper end of the support member and the lowermost surface of the proximal end of the base portion of the hook member located a second distance from the upper end of the support member, the second distance being greater than the first distance.

3. The apparatus according to claim 1 further comprising: the support member further comprising:
   a first side surface;
   a second side surface opposite the first side surface; and
   the first and second side surfaces extending between the front and rear surfaces of the support member;
   a first gripping feature located on the first side surface of the support member; and
   a second gripping feature located on the second side surface of the support member.

4. The apparatus according to claim 3 wherein each of the first and second side surfaces of the support member is concave in the axial direction.

5. The apparatus according to claim 4 wherein the access member comprises a first side surface and a second side surface, each of the first and second side surfaces of the access member being concave in the axial direction; wherein, in the closed state the concave first side surface of the access member is aligned with the concave first side surface of the support member to collectively define a contoured surface that defines a first depression; and wherein, in the closed state the concave second side surface of the access member is aligned with the concave second side surface of the support member collectively define a contoured surface that defines a second depression.

6. The apparatus according to claim 1 further comprising:
   in the closed state, the access member conceals the gripping portion of the stretch-release adhesive tape; and
   in the open state, the gripping portion of the stretch-release adhesive tape is at least partially exposed.

7. The apparatus according to claim 1 further comprising: the access member comprising:
   a cover portion; and
   first and second arm members extending from an upper edge of the cover portion in a spaced-apart manner;
   the first and second arm members pivotably coupled to the support member at an axial location such that, in the closed state, the cover portion extends beyond the lower end of the support member.

8. The apparatus according to claim 1 further comprising: the hook member pivotably coupled to the support member so as to be pivotable, relative to the support member, about a second pivot axis between: (1) a receiving-state; and (2) a retracted-state; and
the second pivot axis being substantially parallel to the first pivot axis.

9. The apparatus according to claim 1 wherein a location of the first pivot axis relative to the support member cannot be changed.

10. The apparatus according to claim 1 wherein the support member and the access member are formed of a hard plastic material.

11. The apparatus according to claim 1 wherein the access member is a separate component from the support member.

12. The apparatus according to claim 11 wherein the access member comprises a first arm member having a first protuberance and a second arm member having a second protuberance, the first and second protuberances nesting within apertures of the support member to pivotably couple the access member to the support member.

13. The apparatus according to claim 1 wherein the access member cannot be translated relative to the support member in a direction of the longitudinal axis.

14. The apparatus according to claim 1 wherein in the closed state an upper edge of a cover portion of the access member abuts a lower end of the support member, and wherein the access member pivots from the closed state to the open state without moving the access member relative to the support member in a direction parallel to the longitudinal axis.

15. An apparatus for supporting articles, the apparatus comprising:
   a front surface;
   a rear surface;
   a first side surface extending between the front surface and the rear surface;
   a second side surface extending between the front surface and the rear surface;
   a support member comprising an upper end and a lower end, the support member extending between the upper and lower ends along a longitudinal axis;
   an access member pivotably coupled to the support member so as to be pivotable, relative to the support member, about a first pivot axis between: (1) a closed-state; and (2) an open-state;
   a hook member extending from the front surface, the hook member comprising a base portion and a retaining portion extending upward from the base portion, the base portion having an uppermost surface and a lowermost surface; and
   wherein the first pivot, axis is located between the uppermost surface of the base portion of the hook member and the upper end of the support member.

16. The apparatus according to claim 15 further comprising:
   a first depression formed into the first side surface and a second depression formed into the second side surface that collectively define a narrowed waist section, a first flared section located on the support member, and a second flared section located on the access member; and
   wherein, in the closed-state, the first depression is defined by a first concave side surface of the support member and a first concave side surface of the access member; and wherein the second depression is defined by a second concave side surface of the support member and a second concave side surface of the access member.

17. The apparatus according to claim 16 further comprising:

a first gripping feature located on the first concave side surface of the support member; and a second gripping feature located on the second concave side surface of the support member.

18. The apparatus according to claim 15 further comprising:
a stretch-release adhesive tape member having an adhesive portion and a gripping portion; and wherein the rear surface of the support member configured to be mounted to a surface with the stretch-release adhesive tape member; and
wherein in the closed state, the access member conceals the gripping portion of the stretch-release adhesive tape and in the open state, the gripping portion of the stretch-release adhesive tape is at least partially exposed.

19. The apparatus according to claim 15 wherein the first pivot axis is at a fixed position relative to the support member and oriented substantially perpendicular to the longitudinal axis, the first pivot axis lying in a plane that is perpendicular to the longitudinal axis and that intersects the hook member, wherein the access member has only one degree of freedom relative to the support member, the one degree of freedom being pivoting about the first pivot axis, and wherein the support member and the access member are separate components formed from a rigid plastic material.

20. An apparatus for supporting articles, the apparatus comprising:
a stretch-release adhesive tape member having an adhesive portion and a gripping portion;
a support member formed of a hard plastic material and comprising:
a rear surface configured to be mounted to a surface with the stretch-release adhesive tape member;
a front surface opposite the rear surface; and
an upper end and a lower end, the support member extending between the upper and lower ends along a longitudinal axis;
a hook member extending outward from the front surface of the support member and upward toward the upper end of the support member;
an access member formed of a hard plastic material, the access member pivotably coupled to the support member so as to be pivotable, relative to the support member, about a first pivot axis between: (1) a closed-state; and (2) an open-state;
wherein the access member cannot be translated relative to the support member in a direction parallel to the longitudinal axis so that the first pivot axis is oriented substantially perpendicular to the longitudinal axis at a fixed position relative to the support member.

* * * * *